US012572805B2

(12) United States Patent
Nakadai et al.

(10) Patent No.: US 12,572,805 B2
(45) Date of Patent: Mar. 10, 2026

(54) NODE PRUNING DEVICE, NODE PRUNING METHOD, AND STORAGE MEDIUM

(71) Applicants: HONDA MOTOR CO., LTD., Tokyo (JP); OSAKA UNIVERSITY, Osaka (JP)

(72) Inventors: Kazuhiro Nakadai, Wako (JP); Yosuke Fukumoto, Wako (JP); Ryu Takeda, Osaka (JP)

(73) Assignees: HONDA MOTOR CO., LTD., Tokyo (JP); OSAKA UNIVERSITY, Osaka (JP)

( * ) Notice: Subject to any disclaimer, the term of this patent is extended or adjusted under 35 U.S.C. 154(b) by 1067 days.

(21) Appl. No.: 17/510,437

(22) Filed: Oct. 26, 2021

(65) Prior Publication Data

US 2022/0138578 A1    May 5, 2022

(30) Foreign Application Priority Data

Nov. 2, 2020    (JP) ................................. 2020-183848

(51) Int. Cl.
| | |
|---|---|
| *G06N 3/082* | (2023.01) |
| *G06F 18/2113* | (2023.01) |
| *G06N 3/048* | (2023.01) |

(52) U.S. Cl.
CPC ......... *G06N 3/082* (2013.01); *G06F 18/2113* (2023.01); *G06N 3/048* (2023.01)

(58) Field of Classification Search
CPC ..... G06N 3/082; G06N 3/048; G06F 18/2113

USPC .......................................................... 706/15
See application file for complete search history.

(56) References Cited

U.S. PATENT DOCUMENTS

| | | | |
|---|---|---|---|
| 2019/0378014 A1 | 12/2019 | Yamamoto et al. | |
| 2019/0378017 A1* | 12/2019 | Kung ..................... | G06N 3/063 |
| 2020/0134459 A1 | 4/2020 | Zeng et al. | |
| 2021/0081798 A1* | 3/2021 | Cho ........................ | G06N 3/082 |

FOREIGN PATENT DOCUMENTS

JP        2019-212206        12/2019

OTHER PUBLICATIONS

Lee et al., "Structure Level Adaptation for Artificial Neural Networks", Springer, 1991 (Year: 1991).*
Luo et al., "An Entropy-based pruning method for CNN Compression", arXiv: 1706.05791v1 [cs.CV] Jun. 19, 2017 (Year: 2017).*

(Continued)

*Primary Examiner* — Tsu-Chang Lee
(74) *Attorney, Agent, or Firm* — Amin, Turocy & Watson, LLP

(57) ABSTRACT
A node pruning device for a network model in which a plurality of layers are continuously connected includes: a node activation section configured to select a node to be pruned on the basis of a score function that represents importance of a node; an inter-layer pairing section configured to prune an input connected to a node pruned at an output of a previous layer; a bypass setting section configured to provide a bypass connection between an input and an output of a layer and not to prune the bypass connection; and a pruning execution section configured to prune the nodes with the same pruning rate for each layer.

6 Claims, 20 Drawing Sheets

(56) References Cited

OTHER PUBLICATIONS

Takeda, et al. "Node pruning based on Entropy of Weights and Node Activity for Small-footprint Acoustic Model based on Deep Neural Networks", INTERSPEECH 2017, Aug. 2017, p. 1636-1640.

Cheng, et al. "A Survey of Model Compression and Acceleration for Deep Neural Networks", CoRR, vol. abs/1710.09282, 2017. [Online]. Available: http://arxiv.org/abs/1710.09282.

Xue, et al. "Restructuring of Deep Neural Network Acoustic Models with Singular Value Decomposition", Proc. of the Annual Conference of the International Speech Communication Association (INTERSPEECH 2013), 2013, pp. 2365-2369.

Sainath, et al. "Low-rank matrix factorization for deep neural network training with high-dimensional output targets", Proc. of 2013 IEEE International Conference on Acoustics, Speech and Signal Processing (ICASSP), 2013, pp. 6655-6659.

Gong, et al. "Compressing deep convolutional networks using vector quantization", CoRR, vol. abs/1412.6115, 2014. [Online]. Available: http://arxiv.org/abs/1412.6115.

Sindhwani, et al. "Structured Transforms for Small-Footprint Deep Learning", Advances in Neural Information Processing Systems 28, C. Cortes, N. D. Lawrence, D. D. Lee, M. Sugiyama, and R. Garnett, Eds. Curran Associates, Inc., 2015, pp. 3088-3096.

Pollot, et al. "An efficient alternative to network pruning through ensemble learning", Proc. of 2020 IEEE International Conference on Acoustics, Speech and Signal Processing (ICASSP), 2020, pp. 4022-4026.

Ba, et al. "Do Deep Nets Really Need to be Deep?", Advances in Neural Information Processing Systems 27: Annual Conference on Neural Information Processing Systems 2014, 2014, pp. 2654-2662. [Online]. Available: http://papers.nips.cc/paper/5484-do-deep-nets-really-need-to-be-deep.

Hinton, et al. "Distilling the Knowledge in a Neural Network", NIPS Deep Learning and Representation Learning Workshop, 2015. [Online]. Available: http://arxiv.org/abs/1503.02531.

Li, et al. "Learning Small-Size DNN with Output-Distribution-Based Criteria", Proc. of the Annual Conference of the International Speech Communication Association (INTERSPEECH2014), 2014.

Kim, et al. "Sequence-Level Knowledge Distillation", Proc. of the 2016 Conference on Empirical Methods in Natural Language Pro-cessing. Association for Computational Linguistics, 2016. [Online]. Available: http://dx.doi.org/10.18653/v1/D16-1139.

Yuan, et al. "Revisiting Knowledge Distillation via Label Smoothing Regularization", IEEE/CVF Conference on Computer Vision and Pattern Recognition (CVPR), Jun. 2020, pp. 3903-3911.

He, et al. "Reshaping deep neural network for fast decoding by node-pruning", Proc. of 2014 IEEE International Conference on Acoustics, Speech and Signal Processing (ICASSP), 2014, pp. 245-249.

Ochiai, et al. "Automatic node selection for deep neural networks using group lasso regularization", Proc. of 2017 IEEE International Conference on Acoustics, Speech and Signal Processing (ICASSP), 2017, pp. 5485-5489.

Takeda, et al. "Acoustic model training based on node-wise weight boundary model for fast and small-footprint deep neural networks", Computer Speech & Language, vol. 46, pp. 461-480, 2017.

Han, et al. "Learning both Weights and Connections for Efficient Neural Networks", Advances in Neural Information Processing Systems 28, C. Cortes, N. D. Lawrence, D. D. Lee, M. Sugiyama, and R. Garnett, Eds. Curran Associates, Inc., 2015, pp. 1135-1143.

Chen, et al. "Compressing Convolutional Neural Networks", CoRR, vol. abs/1506.04449, 2015. [Online]. Available: http://arxiv.org/abs/1506.04449.

Han, et al. "Deep compression: Compressing deep neural networks with pruning, trained quantization and huffman coding", Proc. of 4th International Conference on Learning Representations (ICLR), Y. Bengio and Y. LeCun, Eds., 2016. [Online]. Available: http://arxiv.org/abs/1510.00149.

Li, et al. "Pruning filters for efficient convnets", Proc. of 5th International Conference on Learning Representations (ICLR), 2017. [Online]. Available: https://openreview.net/forum?id=rJqFGTsig.

Molchanov, et al. "Pruning convolutional neural networks for resource efficient inference", Proc. of 5th International Conference on Learning Representations (ICLR), 2017. [Online]. Available: https://openreview.net/forum?id=SJGCiw5gl.

See, et al. "Compression of Neural Machine Translation Models via Pruning", Proc. of The 20th SIGNLL Conference on Computational Natural Language Learning. ACL, 2016. [Online]. Available: http://dx.doi.org/10.18653/v1/K16-1029.

Japanese Office Action for Japanese Patent Application No. 2020-183848 mailed Oct. 3, 2023.

* cited by examiner

| OUTPUT | INPUT | | | |
|---|---|---|---|---|
| | No pruning | Independent | in-layer | inter-layer |
| Frequency | 5.61 | 5.81 | 5.99 | 5.49 |
| Variance | 6.00 | 5.66 | 5.88 | 6.01 |
| Entropy | 5.50 | 5.72 | 5.88 | 5.70 |

FIG. 20

| OUTPUT | INPUT | | | |
|---|---|---|---|---|
| | No pruning | Independent | in-layer | inter-layer |
| Frequency | 8.52 | 8.63 | 8.64 | 8.58 |
| Variance | 8.50 | 8.68 | 8.64 | 8.57 |
| Entropy | 8.54 | 8.69 | 8.61 | 8.56 |

NODE PRUNING DEVICE, NODE PRUNING METHOD, AND STORAGE MEDIUM

CROSS-REFERENCE TO RELATED APPLICATION

Priority is claimed on Japanese Patent Application No. 2020-183848, filed Nov. 2, 2020, the content of which is incorporated herein by reference.

BACKGROUND OF THE INVENTION

Field of the Invention

The present invention relates to a node pruning device, a node pruning method, and a storage medium.

Description of Related Art

In recent years, machine learning such as deep learning has been used in various fields. A model is used for such deep learning. To create a model for deep learning, learning is performed using large-scale labeled data and a neural network structure, for example. Further, it is important to reduce a size of this model. As methods for reducing a size of a model, pruning, factorization, knowledge distillation, and the like are known.

A method for reducing a size of a model can be applied to a fully-connected neural network, such as a deep neural network (DNN) or a convolutional neural network (CNN), which is simple and/or uniform. For example, performing node pruning on an acoustic model of the DNN which is used for speech recognition has been proposed (for example, see Ryu Takeda, Kazuhiro Nakadai, Kazunori Komatani, "Node pruning based on Entropy of Weights and Node Activity for Small-footprint Acoustic Model based on Deep Neural Networks," INTERSPEECH 2017, 2017, p 1636-1640 (hereinafter referred to as Non-Patent Document 1)).

SUMMARY OF THE INVENTION

However, the method for reducing a size of a model in the related art is based on the premise of the simple neural network such as the DNN and the CNN, whereas recent neural networks tend to have a more general network topology such as a bypass connection. Further, recent models generally use a non-linear function, such as ReLU, as an activation function, but the method in the related art is supposed to use a sigmoid function.

Aspects according to the present invention have been made in view of the above problems, and an object of the present invention is to provide a node pruning device, a node pruning method, and a storage medium capable of handling a non-uniform and complicated network and reducing a size of a model.

To solve the above problems and achieve the above object, the present invention has employed the following aspects.

(1) According to an aspect of the present invention, there is provided a node pruning device for a network model in which a plurality of layers are continuously connected, the device including: a node activation section configured to select a node to be pruned on the basis of a score function that represents importance of a node; an inter-layer pairing section configured to prune an input connected to a node pruned at an output of a previous layer; a bypass setting section configured to provide a bypass connection between an input and an output of a layer and to prune nodes other than the bypass connection; and a pruning execution section configured to prune the nodes with the same pruning rate for each layer.

(2) In the node pruning device according to the above aspect (1), a first type of node may be node entropy $q_e$, a second type of node may be frequency-based node activity $q_f$, and a third type of node may be variance-based node activity $q_v$.

(3) In the node pruning device according to the above aspect (2), the node entropy $q_e$ may be defined by the following equation:

$$q_e(l, i \mid D) = -\frac{N_0}{N_{0+1}}\log\frac{N_0}{N_{0+1}} - \frac{N_1}{N_{0+1}}\log\frac{N_1}{N_{0-1}} \qquad \text{[Math. 1]}$$

in the above equation, D is a dataset, $N_0$ and $N_1$ are the numbers of sigmoid-output values with values lower and higher than a threshold, and $N_{0+1}=N_0+N_1$ is equal to the number of samples in the dataset, the frequency-based node activity $q_f$ may be defined by the following equation:

$$q_f(l, i \mid D) = \frac{N_0}{N_{0+1}} \qquad \text{[Math. 2]}$$

and the variance-based node activity $q_v$ may be defined by the following equation:

$$q_v(l, i \mid D) = \frac{1}{N_{0+1}}\sum_{t=1}^{N_{0+1}}(x_t)^2 - (\bar{x})^2 \qquad \text{[Math. 3]}$$

in the above equation, $x_t$ is an activation function ReLU output value of a t-th sample, and $x^-$ indicates an average value of $x_t$ of all the samples in the dataset.

(4) In the node pruning device according to any one of the above aspects (1) to (3), the activation function may be ReLU, and the threshold may be c close to 0.

(5) According to another aspect of the present invention, there is provided a node pruning method of pruning a node for a network model in which a plurality of layers are continuously connected, the method including: causing a node activation section to select a node to be pruned on the basis of a score function that represents importance of a node; causing an inter-layer pairing section to prune an input connected to a node pruned at an output of a previous layer; causing a bypass setting section to provide a bypass connection between an input and an output of a layer and to prune nodes other than the bypass connection; and causing a pruning execution section to prune the nodes with the same pruning rate for each layer.

(6) According to still another aspect of the present invention, there is provided a computer-readable non-transitory storage medium storing a program that causes a computer of a node pruning device which prunes a node for a network model in which a plurality of layers are continuously connected to execute: selecting a node to be pruned on the basis of a score function that represents importance of a node; pruning an input connected to a node pruned at an output of a previous layer; providing a bypass connection between an input and an output of a layer and pruning nodes other than the bypass connection; and pruning the nodes with the same pruning rate for each layer.

According to the above aspects (1) to (6), it is possible to handle a non-uniform and complicated network and to reduce a size of a model. According to the above aspects (1) to (6), the amount of calculation can be reduced.

BRIEF DESCRIPTION OF THE DRAWINGS

FIG. 6 is a diagram showing an example of a first case in which the bypass is not cut.

FIG. 7 is a diagram showing an example of a second case in which the bypass is cut in a higher layer.

FIG. 19 is a diagram showing evaluation results of evaluation (2) in a case in which JNAS is used and a pruning rate is set to 50%.

FIG. 20 is a diagram showing evaluation results of evaluation (2) in a case in which CSJ is used and a pruning rate is set to 50%.

FIG. 22 is a diagram showing evaluation results of evaluation (3) using CSJ.

FIG. 23 is a diagram showing evaluation results of evaluation (4) using JNAS.

FIG. 24 is a diagram showing evaluation results of evaluation (4) using CSJ.

DETAILED DESCRIPTION OF THE INVENTION

Hereinafter, embodiments of the present invention will be described with reference to the drawings.

<Outline>

In the embodiments, to reduce a size of a model, a node pruning method based on node entropy is extended, and a configuration of three criteria for handling a non-uniform neural network (an inter-layer pairing, no bypass connection pruning, and a layer-based pruning rate) is provided.

<Network Structure for Kaldi>

Here, a network structure of a Kaldi speech recognition toolkit (http://kaldi-asr.org/doc/index.html), which is an acoustic model used in the embodiments, will be described.

A basic recipe of a Japanese ASR (automatic speech recognition) model using Kaldi is to use a corpus of spontaneous Japanese (CSJ), for example.

In the embodiments, modifications and updates were made to improve performance as follows.

I. A function was extended to support nnet3-chain model transferred from a liblispeech recipe.

II. Three frames of a 220-dimensional input vector consisting of 40-dimensional Mel-scale log spectrum (MSLS) features were used, and a 100-dimensional iVector was used. In an original CSJ recipe, MFCC was used instead of MSLS.

III. Instead of using SRI Language Modeling (SRILM, Reference 1) used in the CSJ recipe, pocolm (https://github.com/danpovey/pocolm) was used for language model training.

Reference 1: A. Stolcke, J. Zheng, W. Wang, and V. Abrash, "Srilm at sixteen: Update and outlook," in Proc. IEEE Automatic Speech Recognition and Understanding Workshop. IEEE SPS, 2011.

Figure 1:
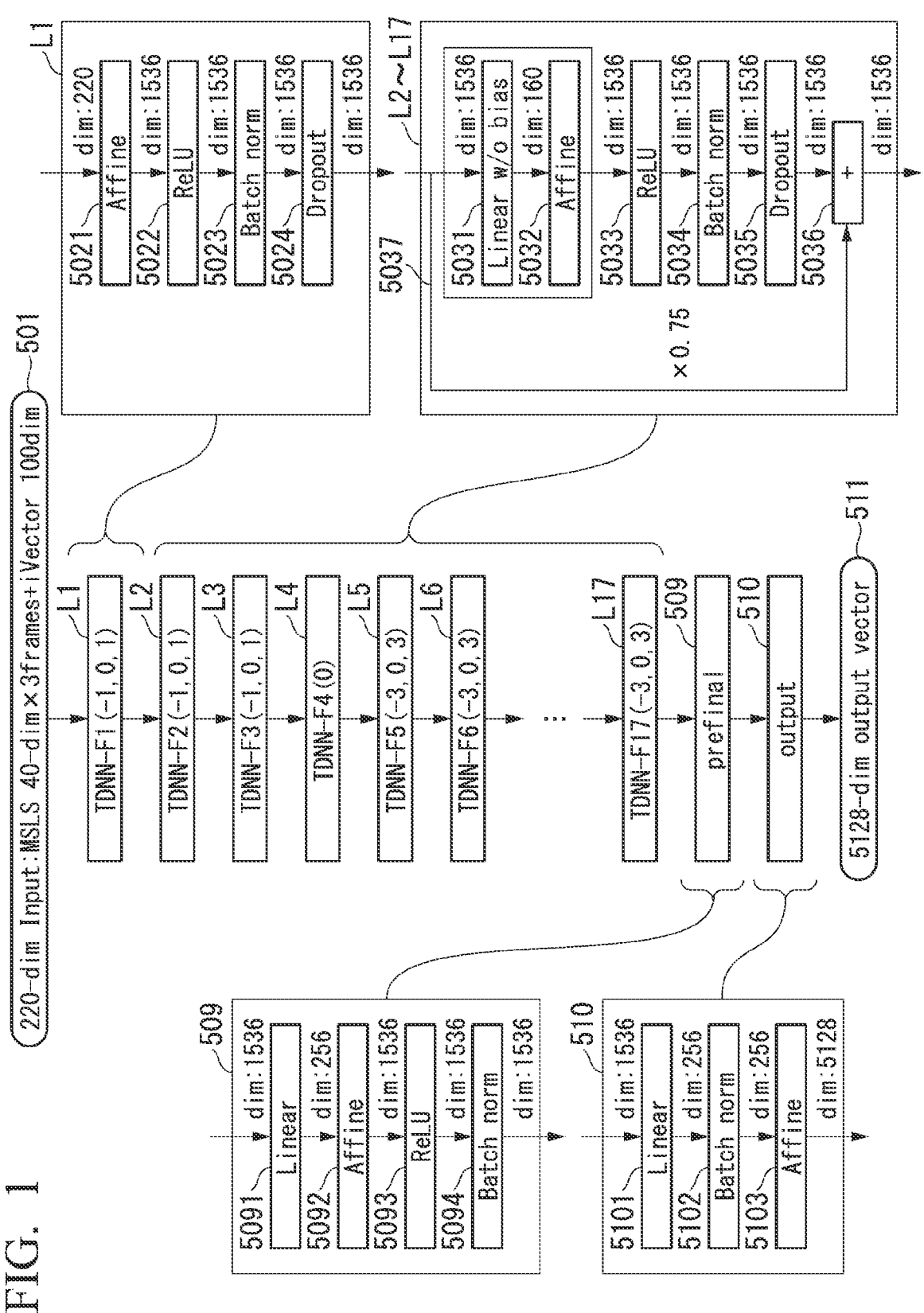
FIG. 1 is a diagram showing a neural network structure of an acoustic model.

FIG. 1 is a diagram showing a neural network structure of an acoustic model. In the example shown in FIG. 1, an example in which there are 19 layers in total will be described, but the present invention is not limited to this.

An input vector 501 has three frames of a 220-dimensional input vector consisting of 40-dimensional MSLS features for each time frame and a 100-dimensional iVector.

A first layer L1 is a time delay neural network (TDNN). The first layer L1 receives the 220-dimensional input vector 501 and outputs a 1,536-dimensional vector for each time frame. In the first layer L1, a fully bound sublayer (Affine) 5021, an activation function sublayer (ReLU) 5022, a batch normalization sublayer (Batch norm (normalization)) 5023, and a dropout sublayer (Dropout) 5024 are connected in that order.

A second layer L2 to a 17th layer L17 consist of TDNN-F and each has 160-dimensional bottleneck layers (5031 to 5035) and a bypass connection 5037. In the second layer L2 to the 17th layer L17, a linear bias sublayer (Liner w/o (without) Bias) 5031, an Affine 5032, a ReLU 5033, a Batch norm 5034, a Dropout 5035, and an addition layer 5036 are connected in that order. At the addition layer 5036, the bottleneck layers (5031 to 5035) and the bypass connection 5037 are added.

The 18th layer is a prefinal layer 509, which has only 256-dimensional bottleneck layers and has no bypass connection. In the prefinal layer 509, a linear bias layer (Liner) 5091, an Affine 5092, a ReLU 5093, and a Batch norm 5094 are connected in that order.

The 19th layer is an output layer 510, which has bottleneck layers of a full linear connection and outputs a 5128-dimensional vector. In the output layer 510, a linear bias layer (Liner) 5101, a Batch norm 5102, and an Affine 5103 are connected in that order.

An output 511 is the 5128-dimensional vector.

As shown in FIG. 1, the batch normalization is performed on all layers, and the dropout is performed on all layers except the last two layers.

In the case of the TDNN, three consecutive frames, that is, (−1, 0, 1), are used for the first layer L1 to the third layer L3.

In the fourth layer L4, only a current frame, that is, (0), is used.

In the fifth layer L5 to the 17th layer L17, every third frame, that is, frames (−3, 0, 3), is used to correspond to a longer context and to speed up the processing.

Basically, the ReLU is used as a non-linear activation function other than the output layer 510. As described above, each layer includes five to eight sublayers consisting of a linear and affine sublayer for factorization, a non-linear sublayer for the activation function ReLU, a batch normalization sublayer, a dropout sublayer, and the like.

Although the network shows an example of a DNN in FIG. 1, it may be another network such as an RNN. The activation function used is not limited to the ReLU and may be another activation function.

<Node Pruning Method>

Next, a node pruning method of the embodiment will be described with reference to FIG. 1.

As shown in FIG. 1, the node pruning method of the embodiment is a combination of node activation based on node entropy, an inter-layer pairing, pruning without a bypass connection, and a layer-based pruning rate configuration.

First, a node activity-based criterion used for pruning criteria will be defined.

In the embodiment, nodes are defined in three types.

A first type of node is node entropy. The node entropy $q_e$ of the i-th node in the 1-th layer $x_{1,i}$ is defined by the following equation (1).

[Math. 4]

$$q_e(l, i \mid D) = -\frac{N_0}{N_{0+1}}\log\frac{N_0}{N_{0+1}} - \frac{N_1}{N_{0+1}}\log\frac{N_1}{N_{0+1}} \quad (1)$$

In the equation (1), D is a dataset, and $N_0$ and $N_1$ are the numbers of sigmoid-output values with values lower and higher than a threshold. $N_{0+1}=N_0+N_1$ is equal to the number of samples in the dataset.

The node entropy works better than output weight norm because it can handle different variances of node activity in each layer.

In the method of the related art, a target network was a DNN of the related art having a sigmoid-based activation function. In such a method of the related art, the sigmoid function from 0 to 1 is used, and thus the threshold for determining whether to count to $N_0$ or $N_1$ is set to 0.5.

However, in Kaldi shown in FIG. 1, the activation function ReLU from 0 to infinity is used, and thus it is difficult to determine such a threshold. Therefore, in the embodiment, at least whether an output value of the activation function ReLU is zero or non-zero is important, and thus c close to 0 is used as the threshold.

The other two second and third types of nodes are defined by frequency-based node activity $q_r$ of the following equation (2) and variance-based node activity $q_v$ of the following equation (3).

[Math. 5]

$$q_f(l, i \mid D) = \frac{N_0}{N_{0+1}} \quad (2)$$

[Math. 6]

$$q_v(l, i \mid D) = \frac{1}{N_{0+1}} \sum_{t=1}^{N_{0+1}} (x_t)^2 - (\bar{x})^2 \quad (3)$$

In the equation (3), $x_t$ is an activation function ReLU output value of a t-th sample, and $x^-$ indicates an average value of $x_t$ of all the samples in the dataset.

Next, regarding a network topology of each layer, a bypass connection and a relationship between three blocks in the layer will be described.

As shown in FIG. 1, the neural network is not uniform even in the layer and consists of a plurality of blocks. To prune such a network, it is necessary to carefully consider characteristics of each block and a relationship between the blocks.

Figure 2:
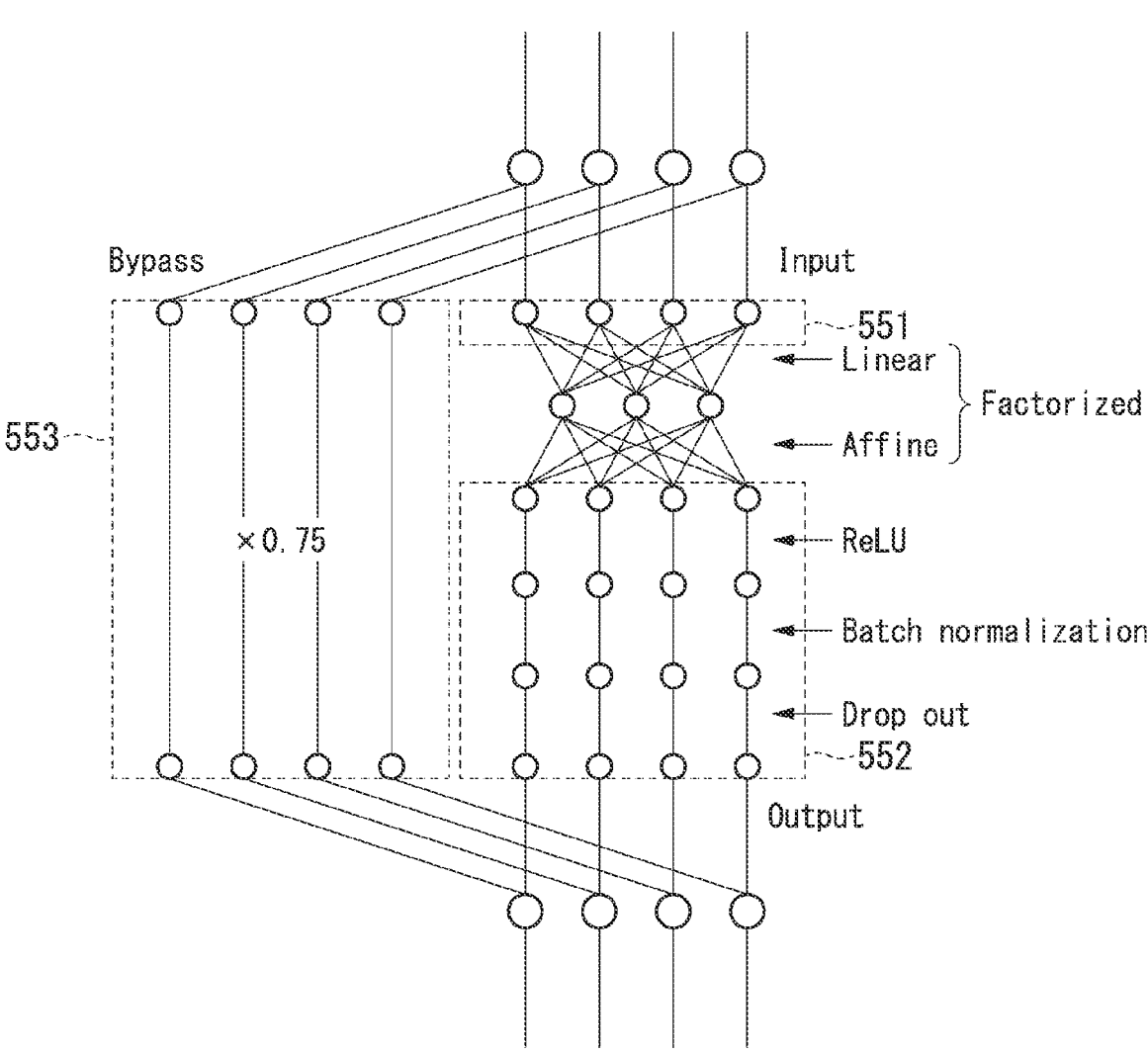
FIG. 2 is a diagram showing a structure of a typical TDNN-F layer of Kaldi.
Figure 3:
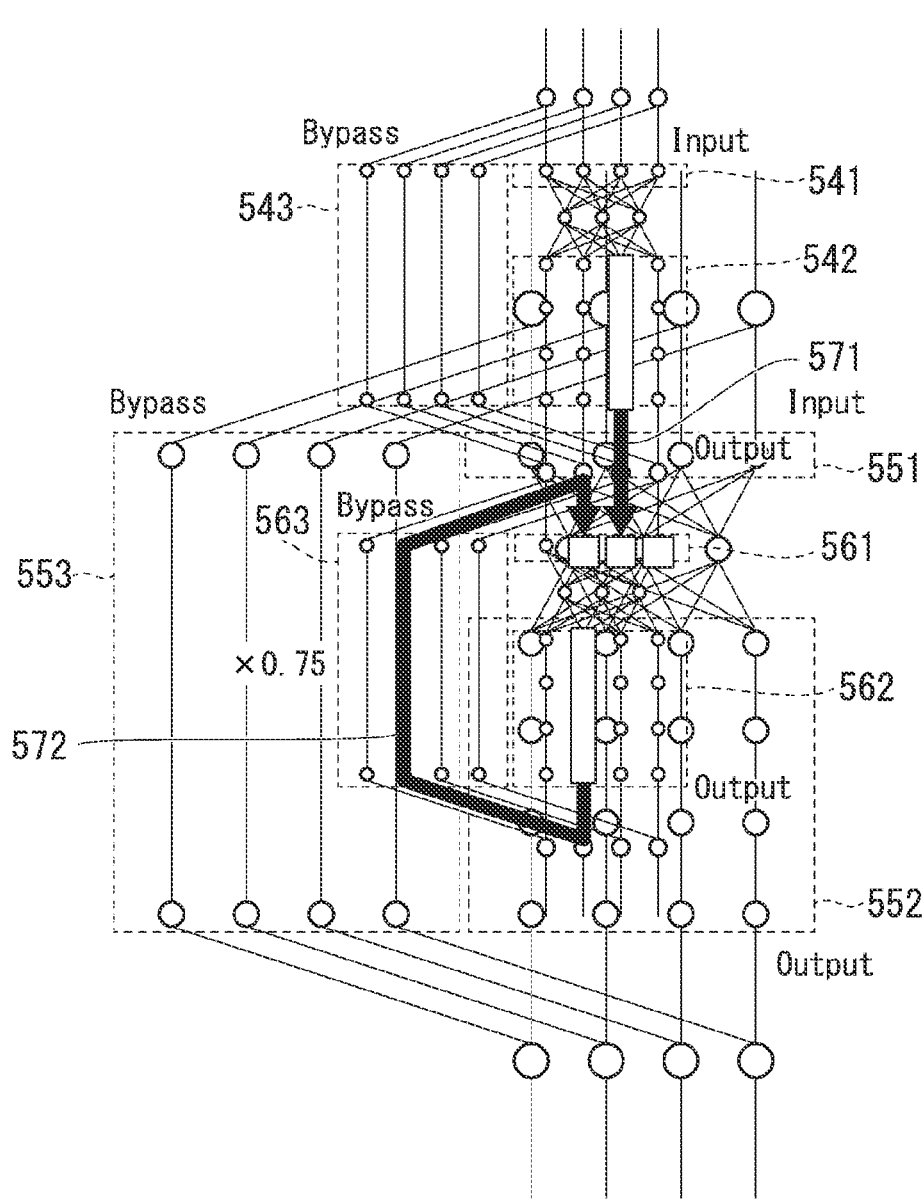
FIG. 3 is a diagram for explaining a relationship between an input and an output.

FIG. 2 is a diagram showing a structure of the typical TDNN-F layer of the Kaldi. FIG. 3 is a diagram for explaining a relationship between an input and an output. FIGS. 2 and 3 show a part of a layer structure. In FIGS. 2 and 3, the TDNN-F layer has three parts: an Input 551, an Output 552, and a Bypass 553. Further, as shown in FIG. 3, the Input 551 has an Input 541, an Output 542, and a Bypass 543, and the Output 552 has an Input 561, an Output 562, and a Bypass 563. Arrow 571 is a first transition example, and arrow 572 is a second transition example.

For simplification, pruning will be broken down into three parts in the description: the Input 551, the Output 552, and the Bypass 553. Pruning is performed on the basis of the "node entropy" after an activation function ReLU sublayer.

First, the Output 552 will be described.

A feature of this output is that it includes a ReLU sublayer. To correspond to this, a pruning unit 13 (FIG. 14) estimates the node activity on the basis of the equation (1) for the activation function ReLU. The pruning unit 13 selects a node to be pruned from the Output 552 on the basis of the estimated node activity and a pruning rate which will be described later.

With respect to the Input 551, focusing only on a factorization portion of FIG. 2, it appears that node pruning can be performed independently of the Output 552. However, the Output 552 is directly connected to the Input 551 of the next layer. As in the structure shown in FIG. 3, it is necessary to consider the relationship between the input and the output in pruning.

Therefore, the inputs are directly connected to each other as shown in FIG. 3. Therefore, in the embodiment, it is determined that a node directly connected to a node pruned at the Output 552 of a previous layer should be pruned from the Input 551 of a current layer. In the embodiment, this is referred to as an "inter-layer pairing." In reality, the Input 551 and the Output 552 of the same layer are connected via the Bypass 553.

A node of the Input 551 and a node of the Output 552 corresponding thereto in the same layer may be pruned together. In the embodiment, this is referred to as an "in-layer pairing."

The Bypass 553 helps to avoid gradient disappearance and explosions, as discussed in ResNet (Reference 2). Therefore, in the embodiment, the Bypass 553 is maintained regardless of the pruning result at the Input 551 and the Output 552.

Reference 2: K. He, X. Zhang, S. Ren, and J. Sun, "Deep residual learning for image recognition," in Proc. of 2016 IEEE Conference on Computer Vision and Pattern Recognition (CVPR). IEEE, 2016.

Figure 4:
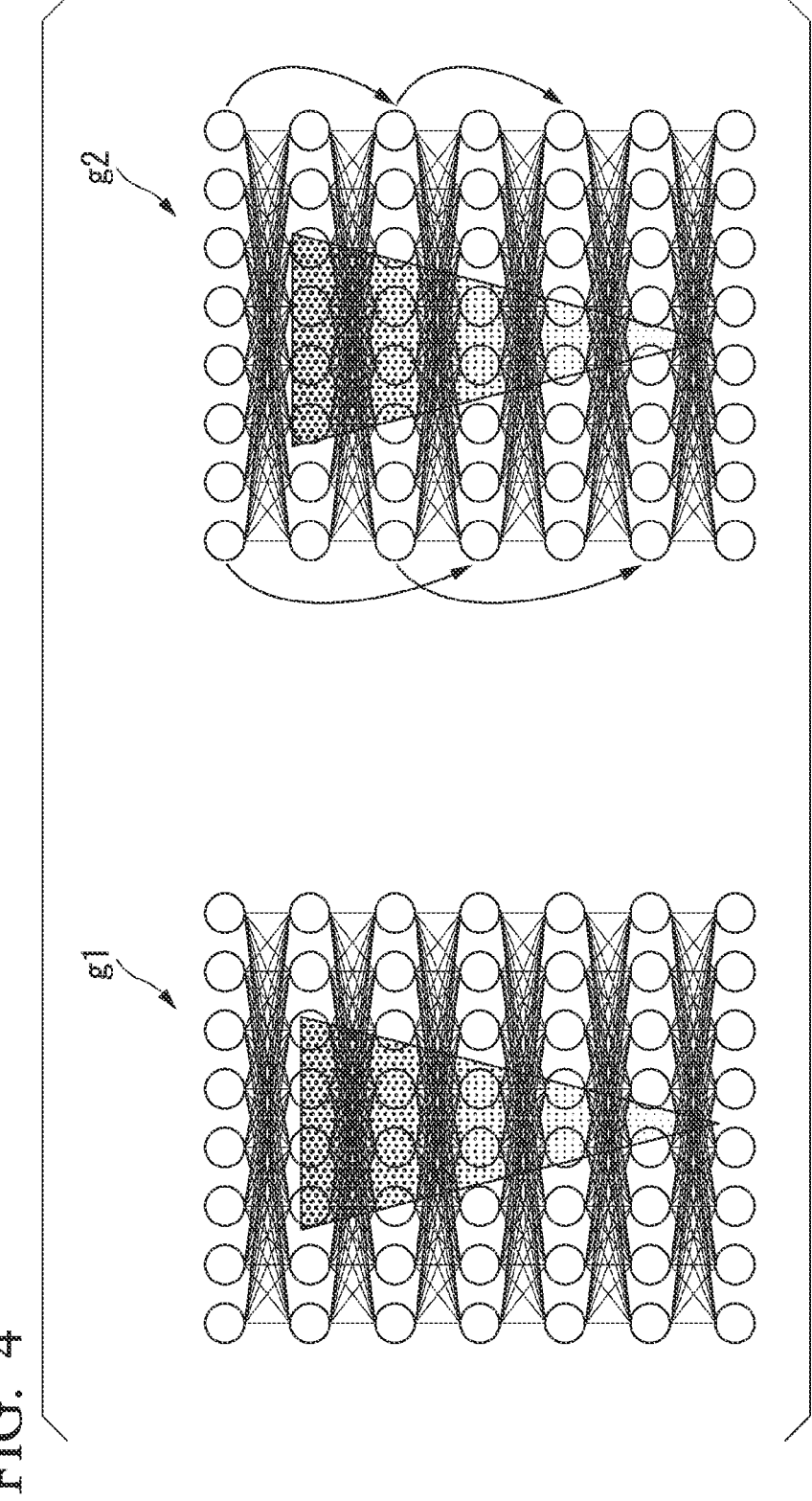
FIG. 4 is a diagram for explaining a role of a bypass.

FIG. 4 is a diagram for explaining a role of a bypass. In a structure g1 without a bypass, it is difficult to transmit information to a deep layer (=gradient disappearance). On the other hand, in a structure g2 having a bypass, the problem that it is difficult to transmit information to a deep layer can be alleviated by a shortcut connection. Therefore, in the embodiment, it is determined that a bypass based on the same idea as the shortcut connection should be left.

Figure 5:
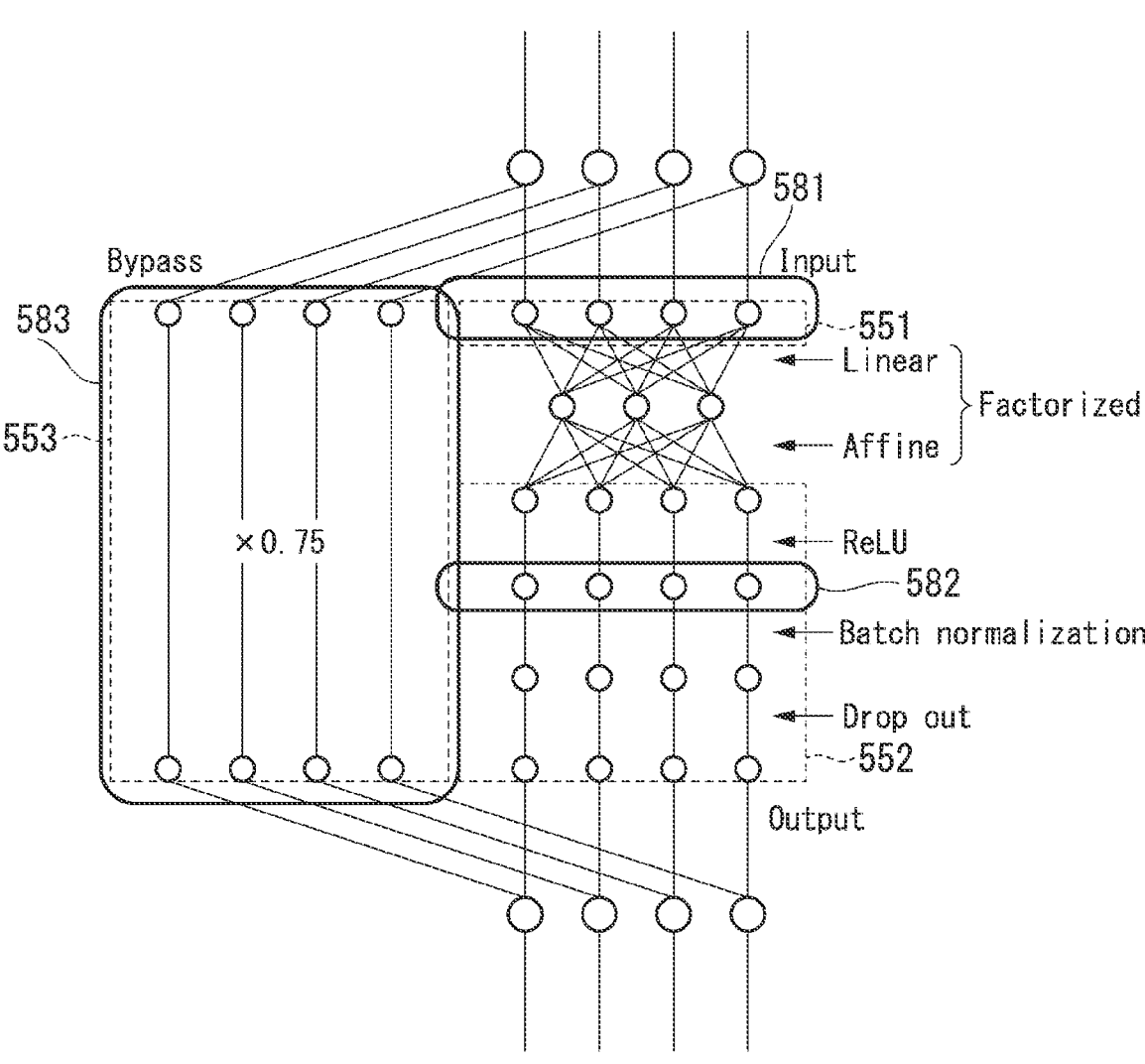
FIG. 5 shows an in-layer pairing, an inter-layer pairing, and a bypass.

The above-mentioned method can be summarized as shown in FIG. 5. FIG. 5 shows an in-layer pairing 581, an inter-layer pairing 582, and a Bypass 583.

Only a node at one end of an inter-layer node connection or an in-layer node connection between the Input 551, the Output 552, and the Bypass 553 may be pruned after pruning a node.

Therefore, in the embodiment, a zero output node is padded in a case in which a node on a lower layer side is pruned, and another node is also pruned together with the connection in a case in which a node on a higher layer side is pruned.

Here, a problem of open end that occurs when the layers are connected will be further described.

Figures 6, 7:
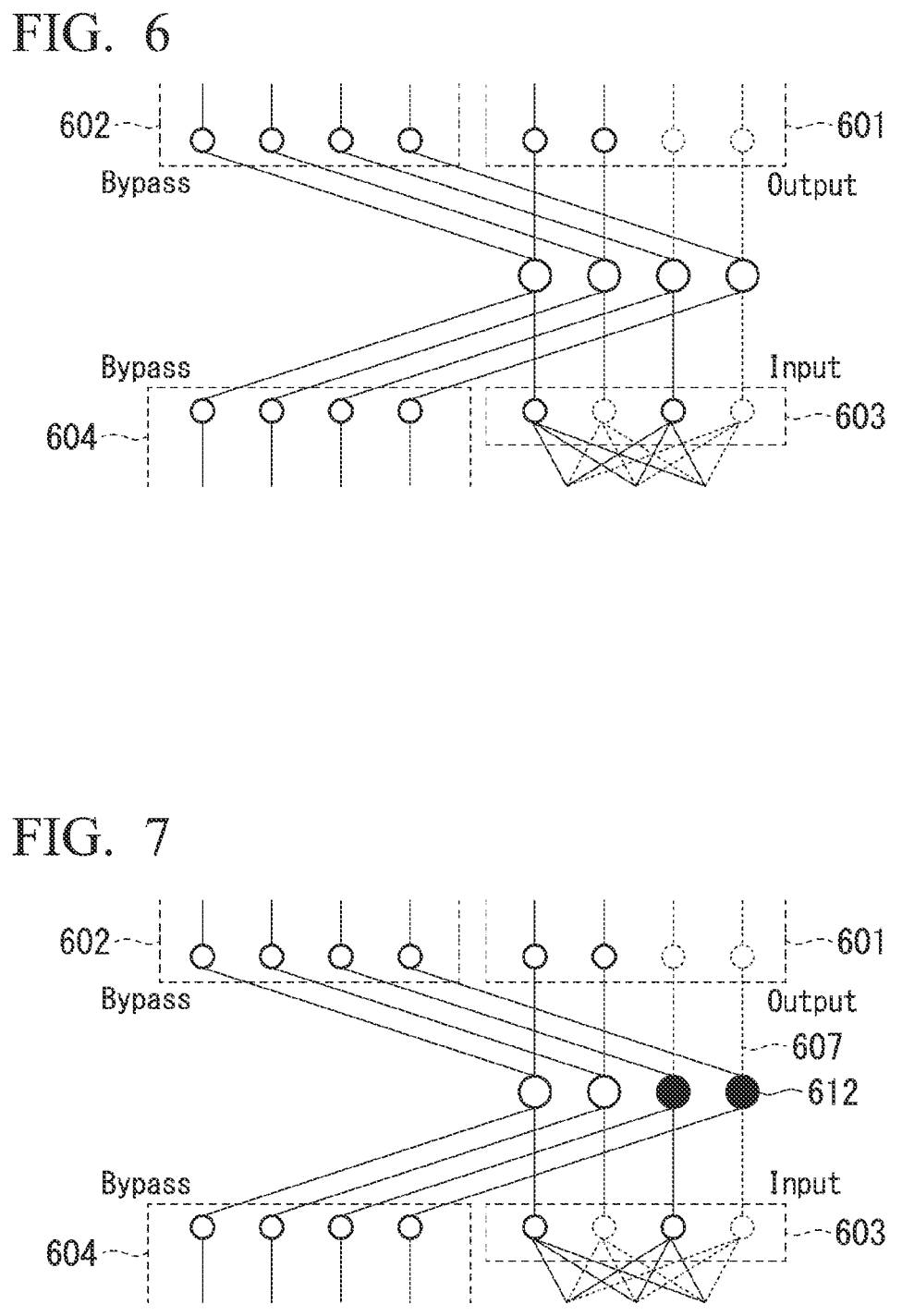
Figure 8:
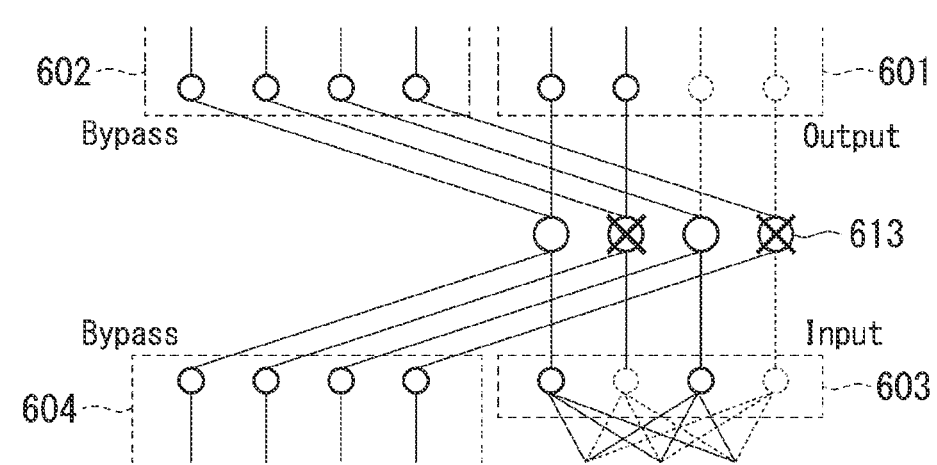
FIG. 8 is a diagram showing an example of a third case in which the bypass is cut in a lower layer.
Figure 9:
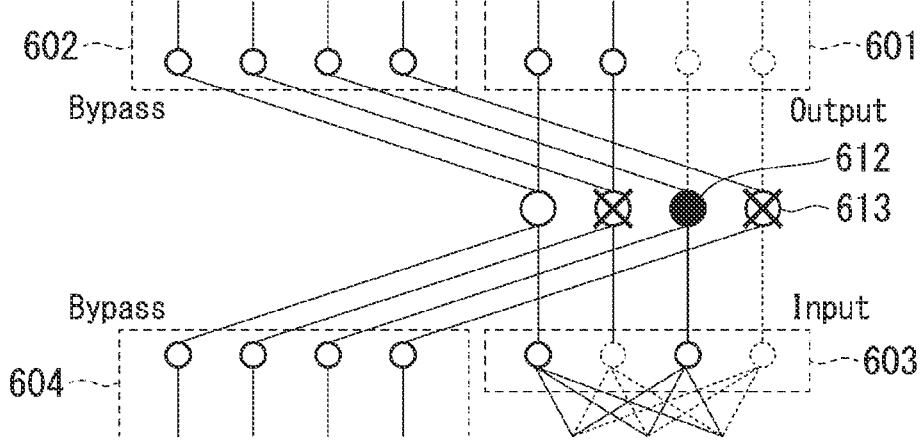
FIG. 9 is a diagram showing an example of a fourth case in which the bypass is cut in both the higher layer and the lower layer.

After pruning, as shown in FIGS. 6 to 9, only the node at the end of the interlayer layer connection or the in-layer node connection between the input, the output, and the bypass may be pruned. FIG. 6 is a diagram showing an example of a first case in which the bypass is not cut. FIG. 7 is a diagram showing an example of a second case in which the bypass is cut in a higher layer. FIG. 8 is a diagram showing an example of a third case in which the bypass is cut in a lower layer. FIG. 9 is a diagram showing an example of a fourth case in which the bypass is cut in both the higher layer and the lower layer.

In FIGS. 6 to 9, reference sign 601 indicates an output layer, reference sign 602 and reference sign 604 indicate bypasses, reference sign 603 indicates an input layer, and a solid line between the nodes is a branch that is not cut (not pruned). In FIG. 7, a chain line 607 between the nodes is a branch that is cut (pruned). A black circle 612 indicates a node that always outputs a value of 0, and a cross mark 613 indicates an ended node.

In the present embodiment, to deal with this open-ended connection, the zero output nodes are paired and the nodes are ended in a case in which no input is provided as in the node of the black circle 612 of FIGS. 7 and 9. Then, in the present embodiment, in a case in which the output as shown in FIGS. 8 and 9 is unnecessary, the bypass is maintained regardless of the pruning result in the input layer or the output layer as described above.

Next, the pruning rate will be described. In the embodiment, the pruning rate is defined as a ratio of the number of pruned nodes to the total number of output nodes.

In the embodiment, the pruning rate may be changed for each layer.

Figure 10:
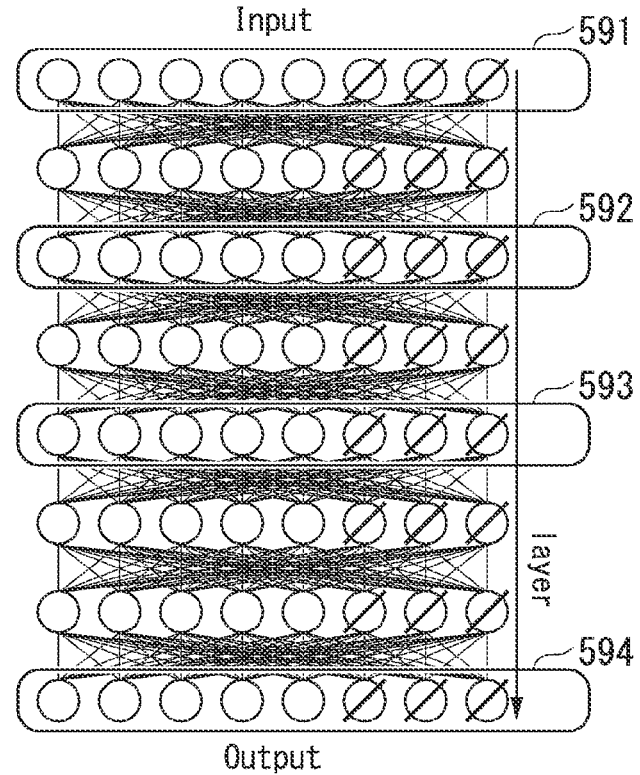
FIG. 10 is a diagram for explaining a pruning rate.

FIG. 10 is a diagram for explaining the pruning rate. In FIG. 10, an upper node is an input layer 591, and a lower node is an output layer 594.

In a case in which pruning is performed, there are tendencies of I to III below.

I. If some intermediate layers 592 and 593 are initialized, performance is maintained.

II. If the input layer 591 or the output layer 594 is replaced with a corresponding layer, performance deteriorates.

III. The higher layer has a low degree of contribution.

From the tendencies of I to III, the higher layers other than the output layer 594 may be pruned more. That is, in the embodiment, the pruning rate may be changed for each layer depending on a use, a purpose, a network configuration, or the like, for example, as a result of reinforcement learning.

Figure 11:
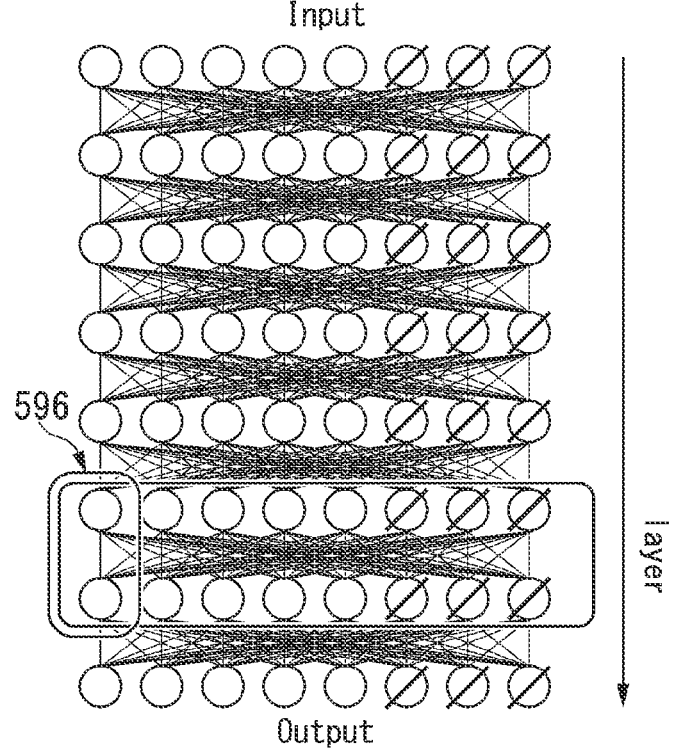
FIG. 11 is a diagram for explaining a case in which each layer has the same pruning rate.

FIG. 11 is a diagram for explaining a case in which each layer has the same pruning rate.

In the network, the following relationships such as IV to VI are known.

IV. A high-order layer 596 which is closer to the output layer should contribute to the final output because it is closer to the output layer than a low-order layer.

V. Since it is difficult to fairly evaluate a difference in importance between nodes in different layers, a uniform pruning rate between the layers is appropriate.

VI. If the high-order layer 596 becomes less in importance, the number of nodes in the high-order layer may not be sufficient with a high pruning rate.

Due to the relationships of IV to VI, the same pruning rate may be sufficient for all layers. Therefore, in the embodiment, the same pruning rate may be used for each layer depending on a use, a purpose, a network configuration, or the like.

Figures 12, 13:
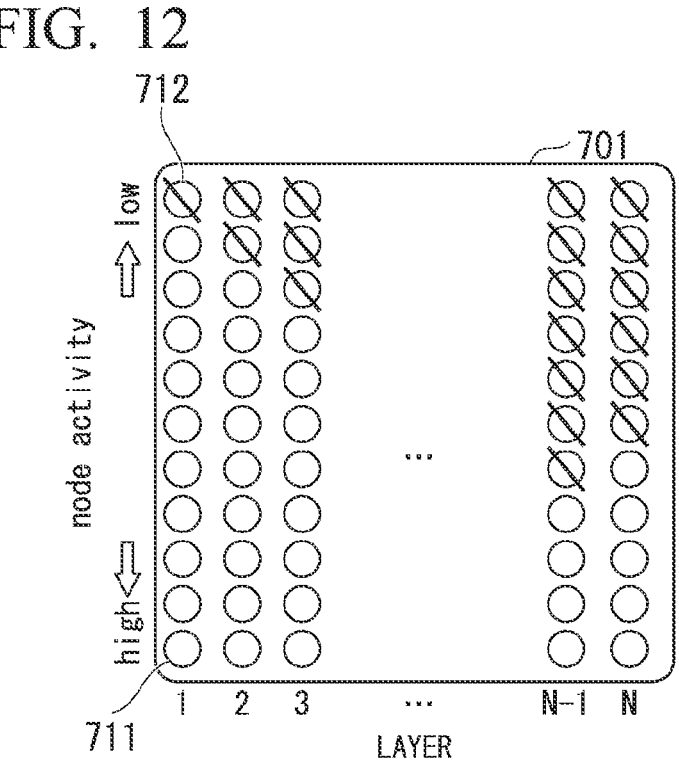
FIG. 12 is a diagram showing a configuration example in which a network-based pruning rate is 30%.
FIG. 13 is a diagram showing a configuration example in which a layer-based pruning rate is 30%.

As shown in FIG. 12, in the embodiment, a setting in which a single pruning rate is used for the entire network is referred to as a "network-based pruning rate setting."

As shown in FIG. 13, in the embodiment, a setting for making the pruning rate of each layer the same is called a "stratified pruning rate setting." FIG. 12 is a diagram showing a configuration example in which a network-based pruning rate is 30%. FIG. 13 is a diagram showing a configuration example in which a layer-based pruning rate is 30%.

On a network basis, 30% of nodes with low activity among all the nodes in the network are pruned. On a layer basis, 30% of the nodes for each layer are pruned. As shown in FIG. 12, in the "network-based pruning rate setting," a node to be pruned is determined for the entire network (701). As shown in FIG. 13, in the "stratified pruning rate setting," the pruning rate of each layer is made the same (702). Reference sign 711 indicates a node not to be pruned, and reference sign 712 indicates a node to be pruned.

Here, a method of selecting a node to be pruned will be described.

The node pruning device 1 (FIG. 1) sets a score function representing the importance of a node on the basis of node entropy and selects a node to be pruned on the basis of the score function (Reference 3). In the embodiment, the score function uses node entropy $q_e$, frequency-based node activity $q_f$, or variance-based node activity $q_v$ depending on the node.

Further, as described above, the node pruning device 1 does not prune the bypass connection. The node pruning device 1 also prunes the node directly connected to the node pruned at the output of the previous layer from the input of the current layer.

Reference 3: Ryu Takeda, Kazuhiro Nakadai, Kazunori Komatani, "Node pruning based on Entropy of Weights and Node Activity for Small-footprint Acoustic Model based on Deep Neural Networks," INTERSPEECH 2017, ISCA, 2017, p 1636-1640.

First Embodiment

Figure 14:
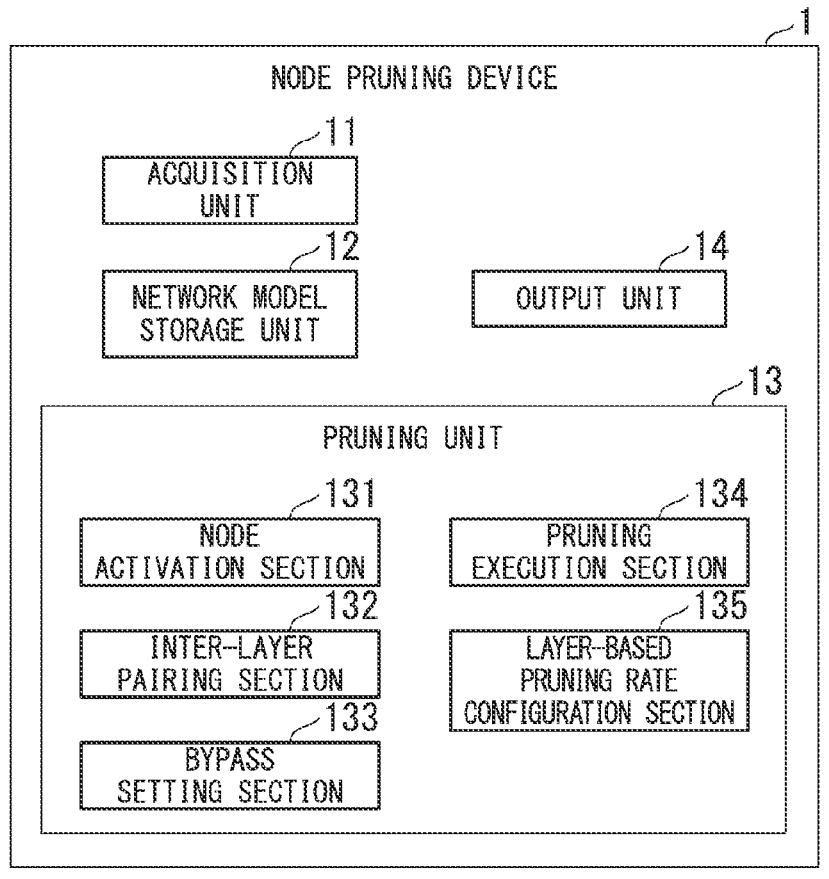
FIG. 14 is a block diagram showing a configuration example of a node pruning device according to a first embodiment.

FIG. 14 is a block diagram showing a configuration example of a node pruning device 1 according to the present embodiment. As shown in FIG. 14, the node pruning device 1 includes an acquisition unit 11, a network model storage unit 12, a pruning unit 13, and an output unit 14.

The pruning unit 13 includes a node activation section 131, an inter-layer pairing section 132, a bypass setting section 133, a pruning execution section 134, and a layer-based pruning rate configuration section 135.

The acquisition unit 11 acquires input data.

The network model storage unit 12 stores a network model such as DNN or RNN used for speech recognition, for example.

The pruning unit 13 executes pruning processing on a network model such as DNN or RNN used for speech recognition, for example. The pruning unit 13 estimates the node activity on the basis of the equation (1) for the activation function ReLU. The pruning unit 13 selects a node to be pruned from the output on the basis of the estimated node activity and the pruning rate.

The node activation section 131 estimates the node activity on the basis of the equation (1).

The inter-layer pairing section 132 pairs the node directly connected to the node pruned at the output of the previous layer to be pruned from the input of the current layer.

The bypass setting section 133 selects a layer to be bypassed and sets the bypass connection.

The pruning execution section 134 prunes a node on the basis of the node activity and the pruning rate.

The layer-based pruning rate configuration section 135 sets the pruning rate to be used for each layer.

The output unit 14 outputs the result recognized using the pruned model.

Next, an example of a processing procedure will be described.

Figure 15:
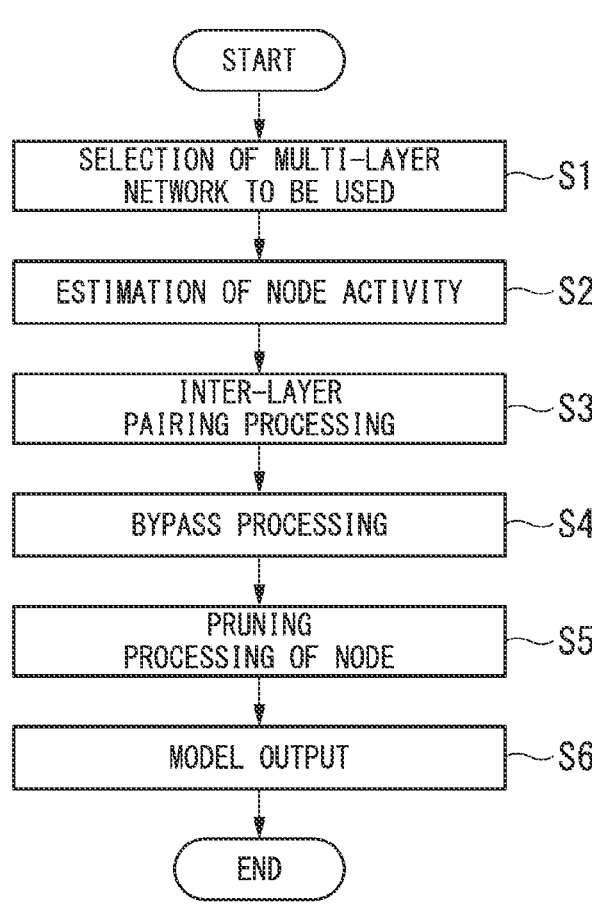
FIG. 15 is a flowchart of a pruning processing procedure according to the first embodiment.

FIG. 15 is a flowchart of a node pruning processing procedure by the node pruning device according to the present embodiment.

(Step S1) The node activation section 131 selects a multi-layer network to be used.

(Step S2) The node activation section 131 estimates the node activity on the basis of the equation (1).

(Step S3) The inter-layer pairing section 132 pairs the node directly connected to the node pruned at the output of the previous layer to be pruned from the input of the current layer.

(Step S4) The bypass setting section 133 selects a layer to be bypassed and sets the bypass connection.

(Step S5) The pruning execution section 134 prunes a node on the basis of the node activity and the pruning rate.

(Step S6) The output unit 136 outputs the model obtained by performing the node pruning processing to an external device.

The above-mentioned processing procedure is an example, and the present invention is not limited to this. For example, the input data may be input and the pruning rate may be reset on the basis of a correct answer rate and a processing time depending on the intended use.

As described above, in the present embodiment, the node pruning based on the node entropy, the "inter-layer pairing," the "bypass without pruning," the "layer-based pruning rate configuration," and the threshold of c close to 0 for the activation function are used.

In the present embodiment, performance deterioration is prevented by employing a constant pruning rate for each layer, the pruning is performed in consideration of link properties (for example, shortcut is excluded), higher performance of the pruning is achieved by introducing a frequency-based node contribution norm, and performance degradation due to the inter-layer pairing and pruning is prevented.

As a result, according to the present embodiment, a dimension of a deep network can be reduced, and thus an execution time can be shortened as shown in evaluation results which will be described later.

According to the present embodiment, it is possible to handle a non-uniform and complex network, and it is possible to handle a non-sigmoid activation function.

Second Embodiment

In the present embodiment, an example in which the above-mentioned acoustic model is applied to speech recognition will be described.

Figure 16:
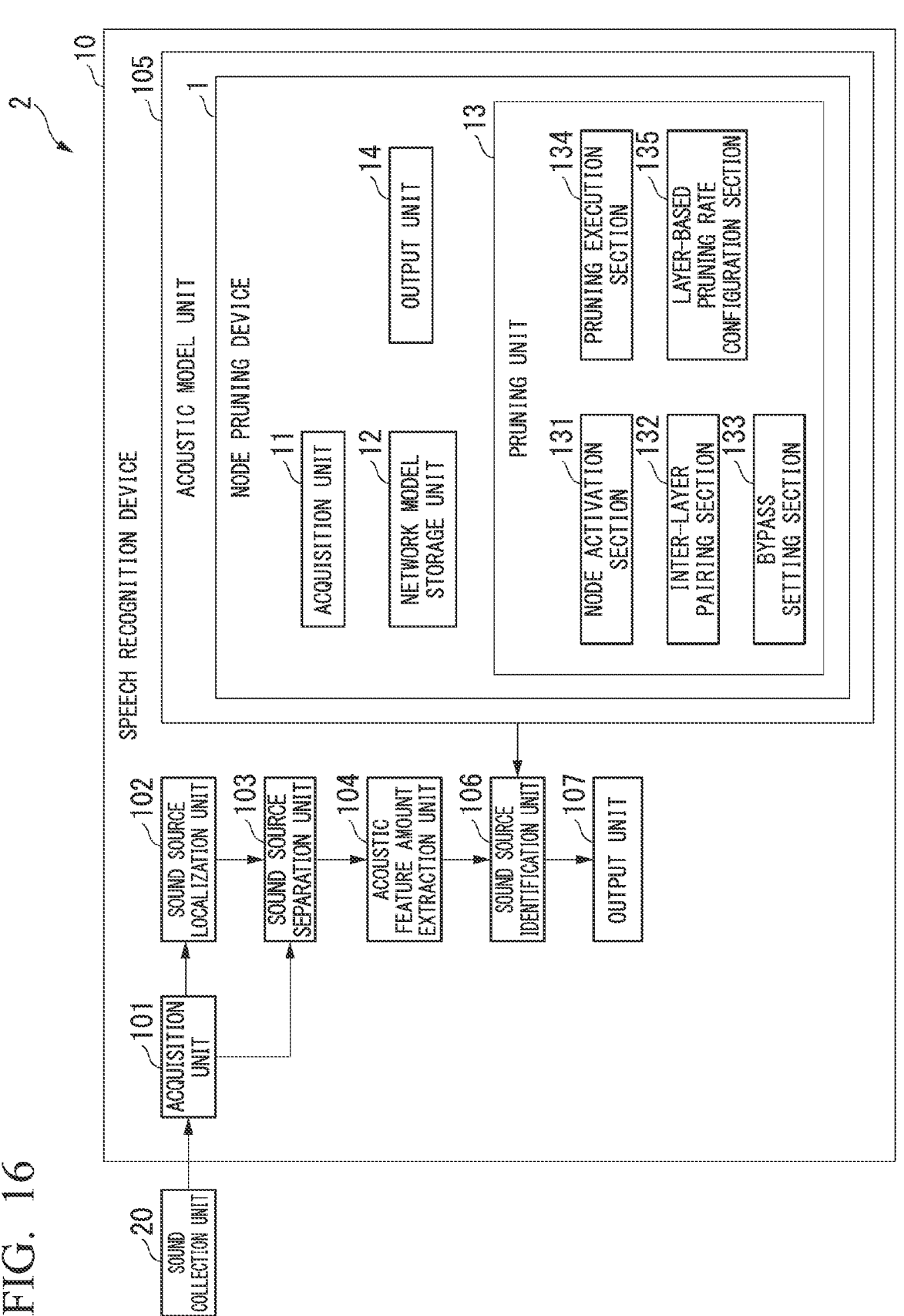
FIG. 16 is a block diagram showing a configuration example of a speech recognition system according to a second embodiment.

FIG. 16 is a block diagram showing a configuration example of a speech recognition system 2 according to the present embodiment. As shown in FIG. 16, the speech recognition system 2 includes a speech recognition device 10 and a sound collection unit 20. The speech recognition device 10 includes an acquisition unit 101, a sound source localization unit 102, a sound source separation unit 103, an acoustic feature amount extraction unit 104, an acoustic model unit 105, a sound source identification unit 106, and an output unit 107.

The acoustic model unit 105 includes the node pruning device 1.

The sound collection unit 20 is a microphone array consisting of M (M is an integer of 2 or more) microphones. The sound collection unit 20 collects acoustic signals emitted from sound sources and outputs the collected M-channel acoustic signals to the acquisition unit 101. In the following description, when one of the M microphones is not specified, it is referred to as "microphones."

The acquisition unit 101 acquires the M-channel analog acoustic signals output from the sound collection unit 20 and converts the acquired analog acoustic signals into a frequency domain by short-time Fourier transform. The plurality of acoustic signals output from the plurality of microphones of the sound collection unit 20 are sampled using signals having the same sampling frequency. The acquisition unit 101 outputs the digitally converted M-channel acoustic signals to the sound source localization unit 102 and the sound source separation unit 103.

The sound source localization unit 102 determines a direction of each sound source on the basis of the M-channel acoustic signals output from the sound collection unit 20 (sound source localization). The sound source localization unit 102 outputs sound source direction information indicating the sound source direction to the sound source separation unit 103.

The sound source separation unit 103 acquires the sound source direction information output from the sound source localization unit 102 and the M-channel acoustic signals output from the acquisition unit 101. The sound source separation unit 103 separates the M-channel acoustic signals into sound source-specified acoustic signals each of which is an acoustic signal indicating a component for each sound source on the basis of the sound source direction indicated by the sound source direction information. The sound source separation unit 103 uses, for example, a geometric-constrained high-order decorrelation-based source separation (GHDSS) method when separating the M-channel acoustic signals into sound source-specified acoustic signals. The sound source separation unit 103 outputs spectra of the separated acoustic signals to the acoustic feature amount extraction unit 104.

The acoustic feature amount extraction unit 104 calculates an acoustic feature amount for speech recognition from the separated spectra output from the sound source separation unit 103 for each sound source. For example, the acoustic feature amount extraction unit 104 calculates a static Mel-scale log spectrum (MSLS), a delta MSLS, and one delta power every predetermined time (for example, 10 ms) to calculate an acoustic feature amount. The MSLS is obtained by inverse discrete cosine transform of a Mel frequency cepstrum coefficient (MFCC) using the spectral feature amount as a feature amount for acoustic recognition. The acoustic feature amount extraction unit 104 outputs the obtained acoustic feature amount to the sound source identification unit 106.

The acoustic model unit 105 stores a sound source model and includes the node pruning device 1. The sound source model is a model used by the sound source identification unit 106 to identify the collected acoustic signals. The acoustic model unit 105 stores the acoustic feature amount of the acoustic signals to be identified as a sound source model in association with information indicating a sound source name for each sound source. The node pruning device 1 performs a node pruning processing on the sound source model in the same manner as in the first embodiment.

The sound source identification unit 106 identifies the sound sources by referring to the pruned acoustic model stored in the acoustic model unit 105 for the acoustic feature amount output from the acoustic feature amount extraction unit 104. The sound source identification unit 106 outputs an identification result to the output unit 107.

The output unit 107 is, for example, an image display unit and displays the identification result output from the sound source identification unit 106.

The configuration example of FIG. 16 is an example, and the present invention is not limited to this. For example, the speech recognition device 10 may include an utterance section detection unit between the sound source separation unit 103 and the acoustic feature amount extraction unit 104.

In the present embodiment, an example in which the node pruning device 1 is applied to prune the node on the sound source model of the speech recognition device has been described, but the present invention is not limited to this. The node pruning device 1 can also be applied to other learning models or recognition models.

According to the present embodiment, a dimension of a deep network can be reduced, and thus an execution time can be shortened as shown in evaluation results which will be described later.

In each of the above-described embodiments, an example in which the node pruning device is applied to the acoustic model of Kaldi has been described, but the present invention is not limited to this. It is possible to apply the embodiment to other acoustic models with non-uniform networks, other learning models with non-uniform networks, and other non-uniform networks.

<Evaluation Results>

Next, examples of evaluation results will be described.

For the evaluation, the embodiment was applied to speech recognition, and four evaluations using a word error rate (WER) as an index and an evaluation of a decoding speed were performed.

Evaluation (1) Verification of Node Activity Based on Node Entropy

In evaluation (1), four node activity definitions of the node entropy of the embodiment and a comparative example (frequency-based, variance-based, and random) were compared. In the evaluation, the pruning rate was changed (selected from 0%, 10%, 30%, 50%, 60%, and 70%), and pruning was performed only on the output. The evaluation was maintained without bypass and input pruning. In the evaluation, the layer-based pruning rate configuration was employed.

Evaluation (2) Verification of Node Pairing Criteria Between Input and Output

In evaluation (2), pairing criteria of the "inter-layer pairing" according to the embodiment and the "in-layer pairing," "independent pruning," and "no pruning" of the comparative example were compared. The "independent pruning" means that the nodes of the input are pruned randomly and is independent of the output. The "no pruning" means not pruning the input to know performance of a best case. Furthermore, in evaluation (2), it was found from the results obtained in evaluation (1) that the WER was maintained at the same level up to 50%, and thus the pruning rate was fixed at 50% as a layer-based configuration.

Evaluation (3) Check of Whether to Prune Bypass Connection

In evaluation (3), two cases of with and without a bypass connection were compared. As an evaluation condition, the pruning rate as a layer-based configuration was changed from 0% to 70%. For other conditions, the node entropy and the inter-layer pairing were used.

Evaluation (4) Verification of Layer-Based Pruning Rate Configuration of Embodiment In evaluation (4), two configurations of a layer-based configuration of the embodiment and a network-based configuration were evaluated. As evaluation conditions, the pruning rate was changed from 0% to 70%, and the node entropy and the inter-layer pairing were used.

Evaluation (5) Evaluation of Decoding Speed

In evaluation (5), a decoding time in a case in which pruning was performed and a decoding time in a case in which pruning was not performed in the comparative example were compared together with the WER. An evaluation condition was a pruning rate of 50%.

Here, the dataset and the like used for the evaluation will be described.

For the learning dataset and the test dataset, two corpora of Japanese newspaper article sentences (JNAS) and CSJ were used. The JNAS consists of 60 hours of speech data which is about 11 times that of the CSJ and a test dataset consisting of 50 sentences of 23 male speakers and 50 sentences of 23 female speakers. The CSJ consists of 660-hour speech data for learning and three test datasets (eval 1-3).

Each test dataset contains approximately 1,300 utterances (in total, 3,949 utterances and 18,376 seconds).

The node activity was calculated using the above equations (1) to (3) with 300 utterances (19 minutes) in each experiment. In equations (1) and (2), c was set to 0.001. In the evaluation, one epoch retraining was performed after pruning the nodes. The evaluation was performed twice under the same conditions, an average WER was calculated, and the WER obtained from the three test datasets was averaged in the CSJ.

Next, evaluation results will be described.

First, evaluation results of evaluation (1) will be described.

Figure 17:
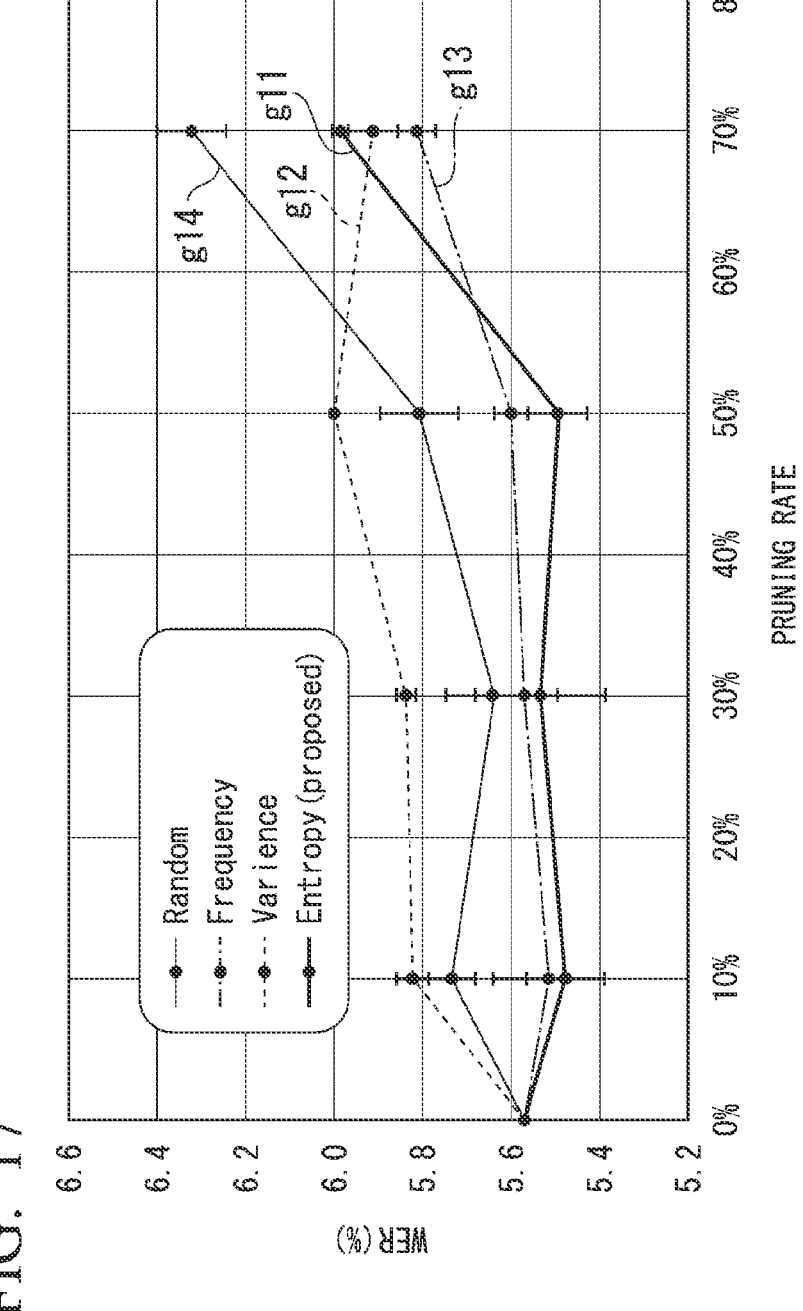
FIG. 17 is a diagram showing evaluation results of evaluation (1) using JNAS.
Figure 18:
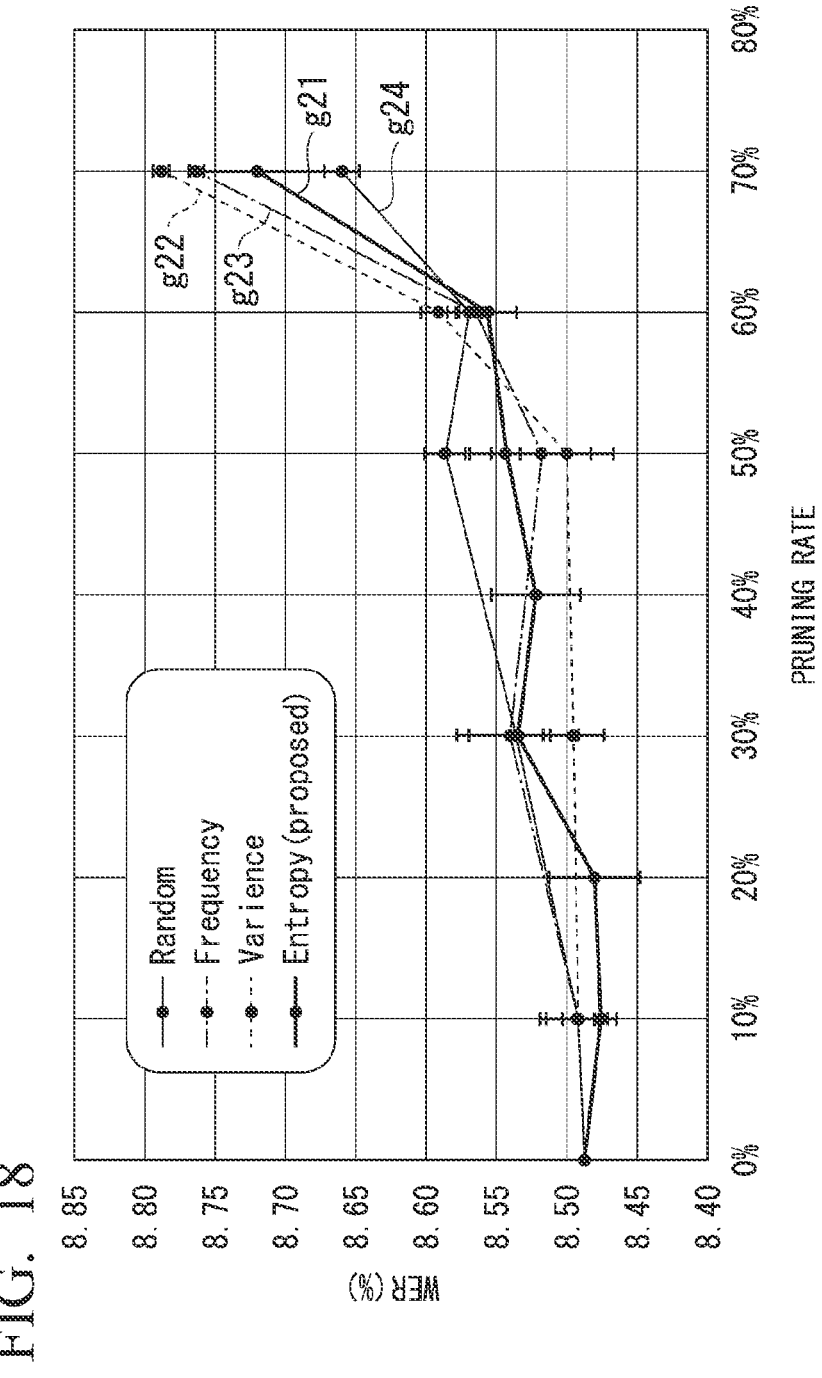
FIG. 18 is a diagram showing evaluation results of evaluation (1) using CSJ.

FIG. 17 is a diagram showing evaluation results of evaluation (1) using the JNAS. FIG. 18 is a diagram showing evaluation results of evaluation (1) using the CSJ. In FIGS. 17 and 18, a horizontal axis represents the pruning rate, and a vertical axis represents the WER. Polygonal lines g11 and g21 are evaluation results based on the node entropy of the embodiment, polygonal lines g12 and g22 are evaluation results based on the frequency of the comparative example, polygonal lines g13 and g23 are evaluation results based on the variance of the comparative example, and polygonal lines g14 and g24 are evaluation results according to the random of the comparative example.

As shown in FIG. 17, in the JNAS, the frequency-based node activity and node-entropy-based node activity are superior to the random node activity, and the node entropy shows the best performance.

As shown in FIG. 18, in the CSJ, there is no significant difference between the three methods of the comparative example, but since the node entropy exceeded the random at the pruning rate of 0% to 60%, the node entropy showed the most stable performance in the pruning rate.

From FIGS. 17 and 18, as a whole, the node entropy according to the embodiment showed the best performance. This result shows the validity of using c as the threshold of the activation function ReLU instead of using the threshold of 0.5 for the sigmoid.

The reasons why the definition based on the node entropy of the embodiment is basically superior to other definitions are as follows.
1) The variance-based method assumes a Gaussian distribution, but the output of the ReLU sublayer is a non-linear and asymmetrical distribution.
2) The frequency-based method (Equation (2)) considers only a first term on a right side of Equation (1) and lacks the consideration of a second term.

Next, evaluation results of evaluation (2) will be described.

FIG. 19 is a diagram showing evaluation results of evaluation (2) in a case in which the JNAS is used and the pruning rate is set to 50%. FIG. 20 is a diagram showing evaluation results of evaluation (2) in a case in which the CSJ is used and the pruning rate is set to 50%. In FIGS. 19 and 20, the inputs are, in order from left, "no pruning," "independent pruning" (Independent), "in-layer pairing" (in-layer), and "inter-layer pairing" (inter-layer) of the embodiment. Since the "no pruning" is that no pruning is performed on the input, the "no pruning" can be regarded as an Oracle condition which is the best case performance. In FIGS. 19 and 20, the outputs are "frequency," "variance", and "entropy" in order from top to bottom.

As shown in FIG. 19, in the JNAS, the inter-layer pairing of the embodiment shows the best performance except for the variance-based node activity. As shown in FIG. 20, in the CSJ, the inter-layer pairing of the embodiment showed the best performance in all cases. The WER in a case in which the inter-layer pairing was used was equivalent to the WER in a case in which "no pruning" was used.

These results show the effectiveness of the inter-layer pairing of the embodiment because the outputs and the inputs of the current layer are directly connected and the outputs and the inputs of the same layer are connected via factorization.

Next, evaluation results of evaluation (3) will be described.

Figure 21:
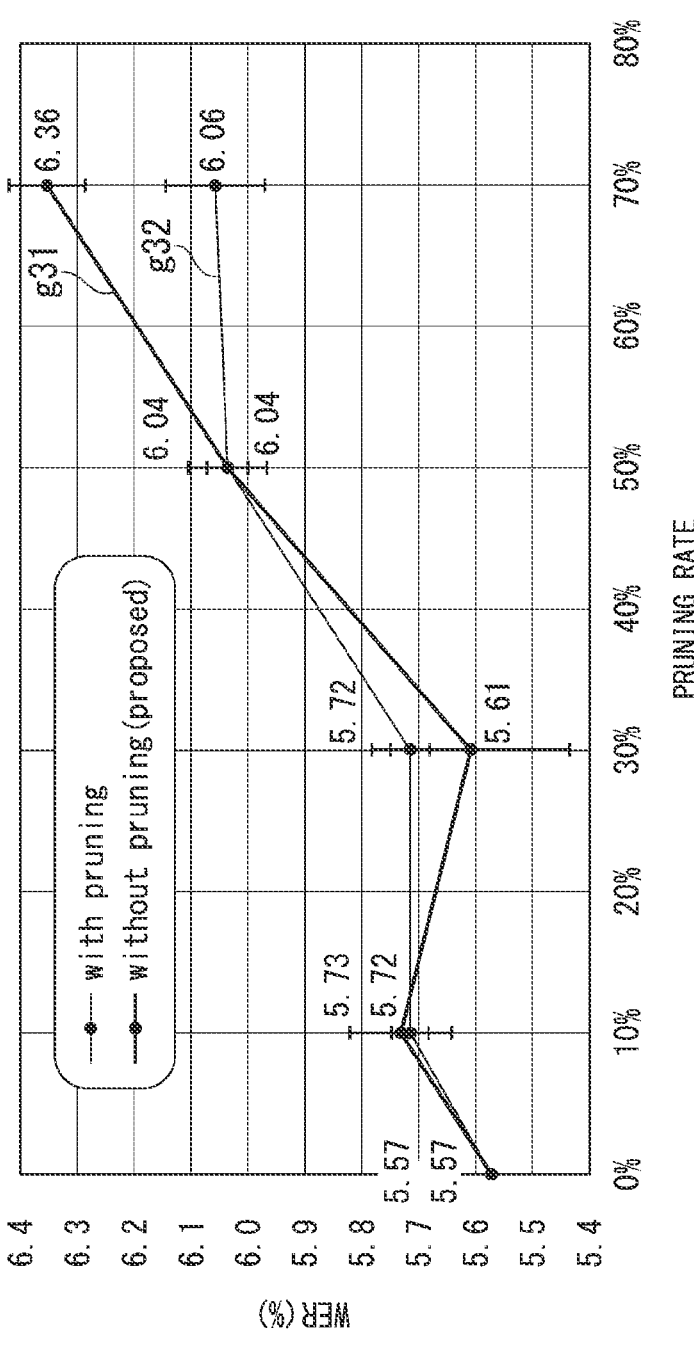
FIG. 21 is a diagram showing evaluation results of evaluation (3) using JNAS.
Figure 22:
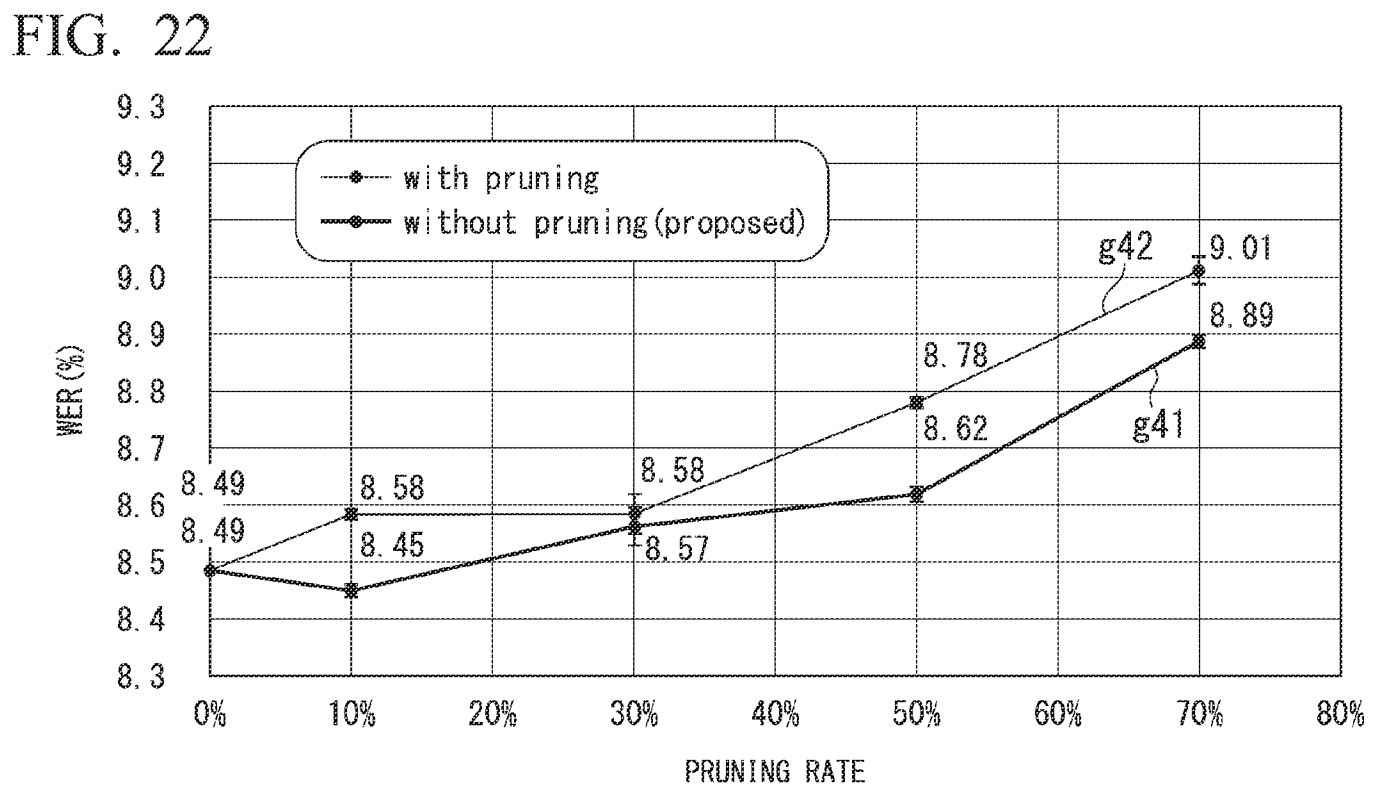

FIG. 21 is a diagram showing evaluation results of evaluation (3) using the JNAS. FIG. 22 is a diagram showing evaluation results of evaluation (3) using the CSJ. In FIGS. 21 and 22, a horizontal axis is the pruning rate, and a vertical axis is the WER. Polygonal lines g31 and g41 are results of without a bypass connection and with pruning of the embodiment, and polygonal lines g32 and g42 are results of without a bypass connection and without pruning.

As shown in FIGS. 21 and 22, the JNAS and the CSJ showed the same performance. As shown in FIG. 22, the CSJ shows that the bypass connection needs to be maintained even in a case in which the corresponding node is pruned between the input and the output.

Considering these results, it is found that the bypass connection should not be pruned, and this suggests that the bypass connection contributes strongly to the performance of speech recognition compared to other parts of the network.

Next, evaluation results of evaluation (4) will be described.

Figure 23:
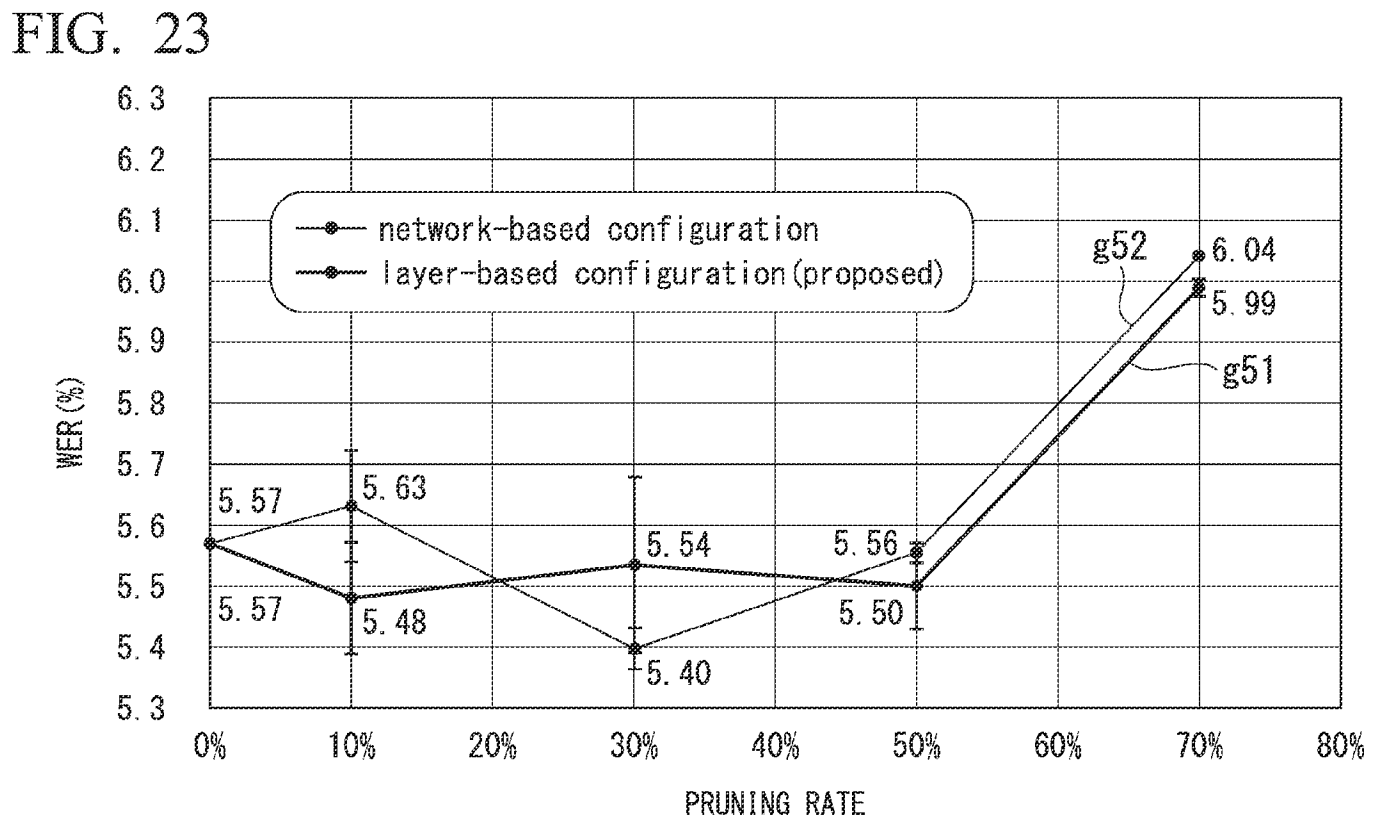
Figure 24:
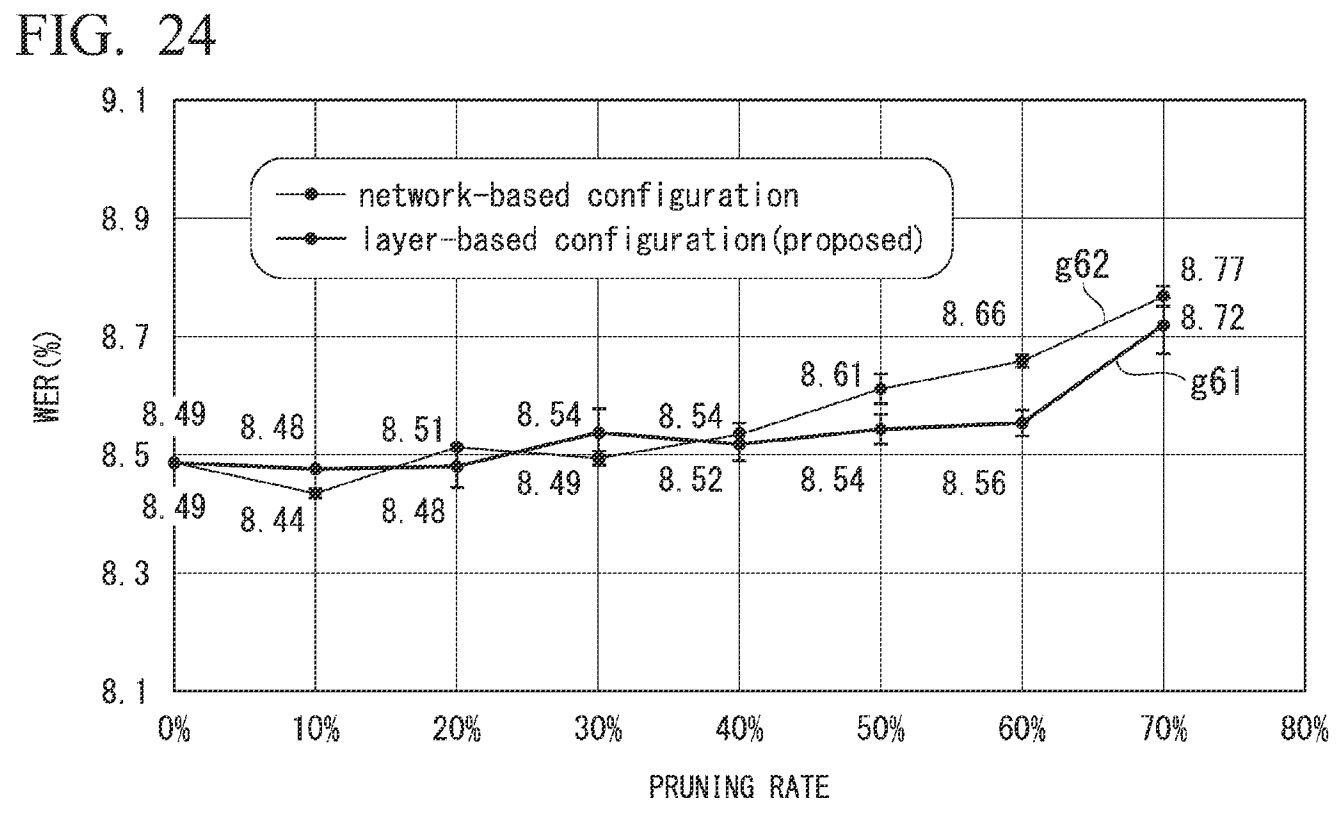

FIG. 23 is a diagram showing evaluation results of evaluation (4) using the JNAS. FIG. 24 is a diagram showing evaluation results of evaluation (4) using the CSJ. In FIGS. 23 and 24, a horizontal axis is the pruning rate, and a vertical axis is the WER. Polygonal lines g51 and g61 are results of the layer-based configuration of the embodiment, and the polygonal lines g52 and g62 are results of the network-based configuration.

As shown in FIGS. 23 and 24, in the JNAS and the CSJ, in a case in which the pruning rate is 40% or less, both configurations showed the same performance, but when the pruning rate exceeds 50%, the layer-based configuration of the embodiment was superior to the network-based configuration.

To confirm this, the number of remaining nodes in each layer was checked.

Figure 25:
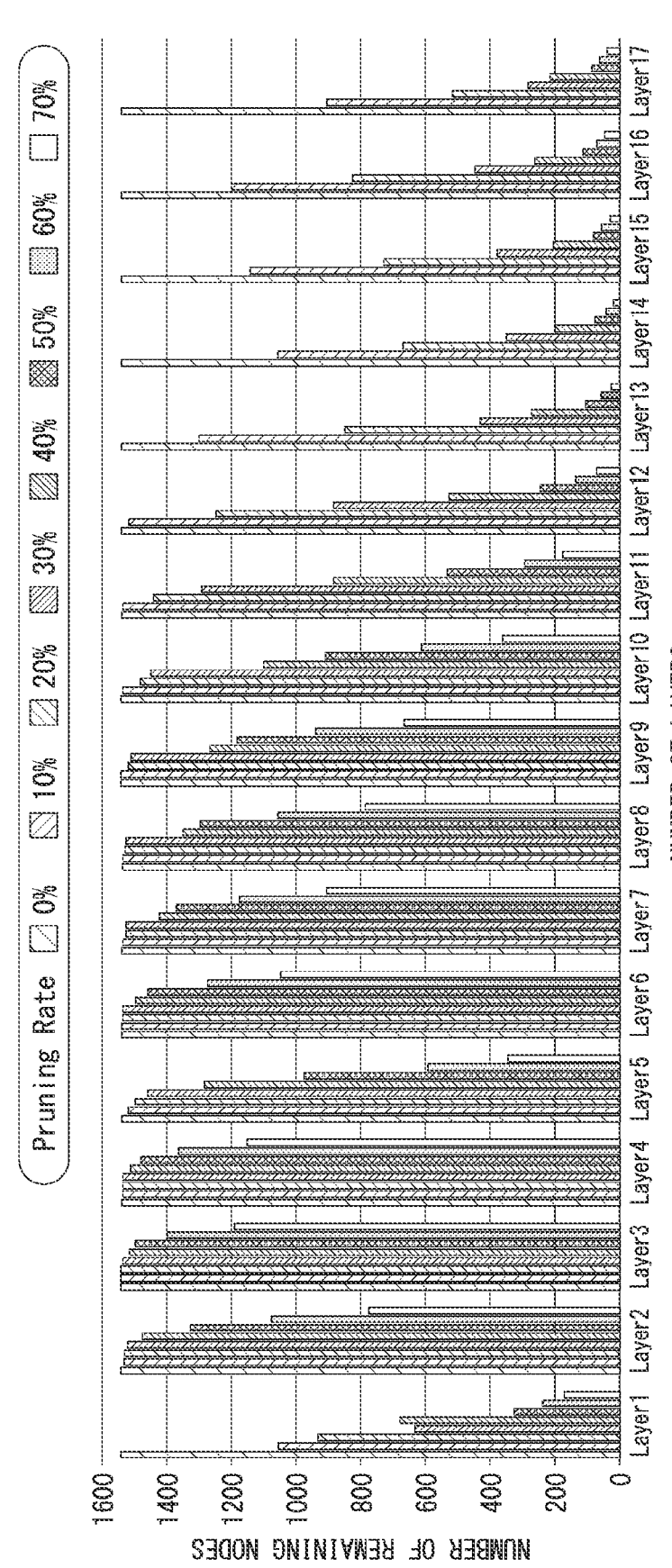
FIG. 25 shows results for a network-based pruning rate configuration of a comparative example.

FIG. 25 shows results for a network-based pruning rate configuration of a comparative example. Each bar in a bar graph is 0%, 10%, 20%, 30%, 40%, 50%, 60%, and 70% from left to right. A horizontal axis is the number of the layers, and a vertical axis is the number of the remaining nodes.

As shown in FIG. 25, the pruning rate of the higher layer is increasing, and even if the pruning rate is increasing, the number of nodes remains small. This suggests that at a high pruning rate, the number of nodes in the higher layer is too small. On the other hand, in the layer-based pruning rate configuration of the embodiment, the number of the remaining nodes is maintained at the same number between the layers, and the performance is stable even at a high pruning rate.

Next, evaluation results of evaluation (5) will be described.

As the test data, the CSJ test dataset (eval 1 to 3) including speech data of 18,376 seconds was used. In the evaluation, one core of Intel (a registered trademark) Xeon (a registered trademark) ES-2697A v4 (2.6 GHz) was used.

In the comparative example, in a case in which the pruning was not performed, the average WER was 8.49%, and the decoding time was 3,036 seconds.

On the other hand, in the embodiment, the average WER was 8.57%, and the decoding time was 2,388 seconds in a case in which the pruning rate was 50%. Therefore, according to the embodiment, a speed improvement of 31% can be achieved while accuracy of the speech recognition is maintained at the same level.

To summarize the above evaluation results, the method of the embodiment in which the entropy-based node activity, the inter-layer paring, without pruning of a bypass, and the layer-based pruning rate configuration are combined showed the best performance.

A 50% pruning rate was appropriate for the two corpora of the JNAS and the CSJ having different sizes in evaluations (1), (3) and (4), and a 31% speed improvement was achieved. In this way, a balance between WER and the decoding speed changes depending on an application.

Further, the method of the embodiment was effective not only for a small size corpus of the JNAS in which it is easy to compress the learned model, but also for a large size corpus of the CSJ in which it is difficult to compress the model.

A program for realizing all or a part of the functions of the node pruning device 1 in the present invention may be recorded on a computer-readable recording medium, and the program recorded on the recording medium may be read and executed by a computer system. As a result, all or part of the processing of the node pruning device 1 may be performed. The term "computer system" as used herein includes an OS and hardware such as peripheral devices. The "computer system" also includes a WWW system provided with a homepage providing environment (or a display environment). The "computer-readable recording medium" is a storage device such as a portable medium, for example, a flexible disk, a magneto-optical disk, a ROM, or a CD-ROM, or a hard disk built in the computer system. Furthermore, examples of the "computer-readable recording medium" include a volatile memory (RAM) inside the computer system that serves as a server or client in a case in which a program is transmitted via a network such as the Internet or a communication channel such as a telephone channel. The volatile memory holds the program for a certain period of time.

The above program may be transmitted from a computer system in which this program is stored in a storage device or the like to another computer system via a transmission medium or with a transmission wave in the transmission medium. Here, the "transmission medium" for transmitting a program is a medium having a function of transmitting information like a network (a communication network) such as the Internet or a communication channel (a communication line) such as a telephone channel. The above program may be for realizing a part of the above-mentioned functions. Further, the program may be a so-called difference file (a difference program) that can realize the above-mentioned functions in combination with a program already recorded in the computer system.

Although the embodiments for carrying out the present invention have been described above using the embodiments, the present invention is not limited to these embodiments, and various modifications and substitutions can be added without departing from the gist of the present invention.

What is claimed is:

1. A node pruning device for a neural network in which a plurality of layers are continuously connected, the device comprising:

a memory that stores computer executable components; and a processor that executes the computer executable components stored in the memory, wherein the computer executable components comprise:

a node activation section configured to access a storage database comprising the plurality of layers and to select a first node, of a first layer of the plurality of layers, to be pruned on the basis of a score function that represents importance of the first node;

an inter-layer pairing section configured to perform a pairing so as to prune a second node included in an input of a next layer, being a second layer of the plurality of layers, connected to the first node included in an output of the previous layer being the first layer, which first node was selected by the node activation section to be pruned;

a bypass setting section configured to provide bypass connections between inputs and outputs of layers, of the plurality of layers, including a first bypass connection between the output of the first layer and the input of the second layer, the bypass connections being not to be pruned; and a pruning execution section configured to prune a group of nodes of the plurality of layers such that a pruning rate for each layer, of the plurality of layers, including the first layer and the second layer, is the same, wherein the group of nodes comprise the first node selected by the node activation section as the node to be pruned and the second node included in the input of the second layer where the inter-layer pairing section performed the pairing of the first node and the second node, wherein pruning executed by the pruning execution section results in a reduction in storage space employed at the storage database for storing the plurality of layers, and wherein the neural network is operable with a reduced execution time as compared to prior to the pruning.

2. The node pruning device according to claim 1, the score function is a first type score function based on node entropy $q_e$, a second type score function based on frequency-based node activity $q_f$, or a third type score function based on variance-based node activity $q_v$.

3. The node pruning device according to claim 2, wherein the node entropy $q_e$ is defined by the following equation:

$$q_e(l, i \mid D) = -\frac{N_0}{N_{0+1}} \log \frac{N_0}{N_{0+1}} - \frac{N_1}{N_{0+1}} \log \frac{N_1}{N_{0-1}} \qquad \text{[Math. 1]}$$

in the above equation, D is a dataset, $N_0$ and $N_1$ are the numbers of sigmoid-output values with values lower and higher than a threshold, and $N_{0+1}=N_0+N_1$ is equal to the number of samples in the dataset, wherein the frequency-based node activity $q_f$ is defined by the following equation:

$$q_f(l, i \mid D) = \frac{N_0}{N_{0+1}} \qquad \text{[Math. 2]}$$

and wherein the variance-based node activity $q_v$ is defined by the following equation:

$$q_v(l, i \mid D) = \frac{1}{N_{0+1}} \sum_{t=1}^{N_{0+1}} (x_t)^2 - (\bar{x})^2 \qquad \text{[Math. 3]}$$

in the above equation, $x_t$ is an activation function ReLU output value of a t-th sample, and $x^-$ indicates an average value of $x_t$ of all the samples in the dataset.

4. The node pruning device according to claim 1, wherein the activation function is ReLU, and wherein the threshold is c close to 0.

5. A node pruning method of pruning a node for a neural network in which a plurality of layers are continuously connected, the method comprising:

causing, by a system operatively coupled to a processor that is operatively coupled to a memory, a node activation section to access a storage database comprising the plurality of layers and to select a first node, of a first layer of the plurality of layers, to be pruned on the basis of a score function that represents importance of the first node;

causing an inter-layer pairing section to perform a pairing so as to prune a second node included in an input of a next layer, being a second layer of the plurality of layers, connected to the first node included in an output of the previous layer being the first layer, which first node was selected by the node activation section to be pruned;

causing a bypass setting section to provide bypass connections between inputs and outputs of layers, of the plurality of layers, including a first bypass connection between the output of the first layer and the input of the second layer, the bypass connections being not to be pruned; and causing a pruning execution section to prune a group of nodes of the plurality of layers such that a pruning rate for each layer, of the plurality of layers, including the first layer and the second layer, is the same, wherein the group of nodes comprise the first node selected by the node activation section as the node to be pruned and the second node included in the input of the second layer where the inter-layer pairing section performed the pairing of the first node and the second node, wherein pruning executed by the pruning execution section results in a reduction in storage space employed at the storage database for storing the plurality of layers, and wherein the neural network is operable with a reduced execution time as compared to prior to the pruning.

6. A computer-readable non-transitory storage medium having program instructions embodied therewith, the program instructions executable by a processor of a node pruning device which prunes a node for a neural network in which a plurality of layers are continuously connected, to cause the processor to execute:

accessing, by the processor, a storage database comprising the plurality of layers;

selecting, by the processor, a first node, of a first layer of the plurality of layers, to be pruned on the basis of a score function that represents importance of the first node;

performing a pairing so as to prune a second node included in an input of a next layer, being a second layer of the plurality of layers, connected to the first node included in an output of the previous layer being the first layer, which first node was selected by the node activation section to be pruned;

providing bypass connections between inputs and outputs of layers, of the plurality of layers, including a first bypass connection between the output of the first layer and the input of the second layer, the bypass connections being not to be pruned; and pruning a group of nodes of the plurality of layers such that a pruning rate for each layer, of the plurality of layers, including the first layer and the second layer, is the same, wherein the group of nodes comprise the first node selected by the node activation section as the node to be pruned and the second node included in the input of the second layer where the inter-layer pairing section performed the pairing of the first node and the second node, wherein the pruning results in a reduction in storage space employed at the storage database for storing the plurality of layers, and wherein the neural network is operable with a reduced execution time as compared to prior to the pruning.

* * * * *